(12) United States Patent
Li et al.

(10) Patent No.: US 11,316,646 B2
(45) Date of Patent: Apr. 26, 2022

(54) METHOD AND SYSTEM FOR AUTONOMOUS TRANSMISSION IN A WIRELESS NETWORK

(71) Applicant: Telefonaktiebolaget LM Ericsson (publ), Stockholm (SE)

(72) Inventors: Gen Li, Beijing (CN); Jung-Fu Cheng, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 36 days.

(21) Appl. No.: 16/968,080

(22) PCT Filed: Feb. 15, 2019

(86) PCT No.: PCT/CN2019/075218
§ 371 (c)(1),
(2) Date: Aug. 6, 2020

(87) PCT Pub. No.: WO2019/158124
PCT Pub. Date: Aug. 22, 2019

(65) Prior Publication Data
US 2021/0028906 A1      Jan. 28, 2021

(30) Foreign Application Priority Data

Feb. 16, 2018   (WO) ................ PCT/CN2018/076921

(51) Int. Cl.
*H04L 5/00* (2006.01)
*H04L 1/16* (2006.01)
(Continued)

(52) U.S. Cl.
CPC .......... *H04L 5/0053* (2013.01); *H04L 1/1607* (2013.01); *H04L 1/1887* (2013.01);
(Continued)

(58) Field of Classification Search
CPC ... H04L 1/1607; H04L 1/1887; H04L 5/0007; H04L 5/0053; H04W 72/0406; H04W 74/002
See application file for complete search history.

(56) References Cited

U.S. PATENT DOCUMENTS

2010/0142467 A1   6/2010   Tiirola et al.
2012/0020312 A1   1/2012   Lv et al.
(Continued)

FOREIGN PATENT DOCUMENTS

CN    102017765 A    4/2011
CN    102271413 A    12/2011
(Continued)

OTHER PUBLICATIONS

International Search Report and Written Opinion, PCT App. No. PCT/CN2019/075213, dated Apr. 16, 2019, 10 pages.
(Continued)

*Primary Examiner* — Kevin C. Harper
(74) *Attorney, Agent, or Firm* — Christopher & Weisberg, P.A.

(57) ABSTRACT

Method and apparatus of a source network device and a destination network device for autonomous transmission are provided in this disclosure. In a source network device, a coordination indicator and a portion of data is transmitted to the destination network device, the coordination indicator identifying a resource coordination zone to coordinate interference resolution. Then, the source network device determines whether an acknowledgement is received from the destination device prior to an allocation of its repeated transmission. When a message is detected in the resource coordination zone and the acknowledgement is received, the source device transmits a further portion of the data to be
(Continued)

transmitted. Problem arising from channel interference can be resolved through the provided methods.

20 Claims, 11 Drawing Sheets

(51) Int. Cl.
    *H04L 1/18*     (2006.01)
    *H04W 74/00*    (2009.01)
    *H04W 72/04*    (2009.01)

(52) U.S. Cl.
    CPC ....... *H04L 5/0007* (2013.01); *H04W 72/0406* (2013.01); *H04W 74/002* (2013.01)

(56) References Cited

U.S. PATENT DOCUMENTS

| | | | |
|---|---|---|---|
| 2013/0003590 A1* | 1/2013 | Gage | H04W 52/244 370/252 |
| 2014/0010138 A1 | 1/2014 | Flammer, III | |
| 2015/0055588 A1* | 2/2015 | Yerramalli | H04W 72/0446 370/329 |
| 2015/0230105 A1 | 8/2015 | Negus et al. | |
| 2017/0331577 A1 | 11/2017 | Parkvall et al. | |

FOREIGN PATENT DOCUMENTS

| | | |
|---|---|---|
| CN | 103906198 A | 7/2014 |
| CN | 106797569 A | 5/2017 |
| KR | 20160143704 A | 12/2016 |
| WO | 2016/197315 A1 | 12/2016 |
| WO | 2017096246 A2 | 11/2017 |
| WO | 2019089236 A1 | 5/2019 |

OTHER PUBLICATIONS

International Search Report and Written Opinion, PCT App. No. PCT/CN2019/075218, dated May 8, 2019, 9 pages.
Indian Office Action dated Nov. 24, 2021 for Patent Application No. 202047035001, consisting of 7-pages.
EPO Communication and Search Report dated Nov. 5, 2021 for Patent Application No. 19754533.8 consisting of 11-pages.

\* cited by examiner

METHOD AND SYSTEM FOR AUTONOMOUS TRANSMISSION IN A WIRELESS NETWORK

CROSS-REFERENCE TO RELATED APPLICATIONS

This application is a National stage of International Application No. PCT/CN2019/075218, filed Feb. 15, 2019, which claims priority to International Application No. PCT/CN2018/076921, filed Feb. 16, 2018, which are hereby incorporated by reference.

TECHNICAL FIELD

Embodiments of the invention relate to the field of wireless communications, and more specifically, relate to a method and system for autonomous transmission in a wireless communication network.

BACKGROUND

Channel interference refer to two or more network devices transmitting their respective data in a shared channel simultaneously, and the transmission results in data collision and the data can't be decoded correctly at one or more destination network devices. Contention-based protocols (CBPs) allow multiple users to share the same spectrum by defining the events that must occur when two or more transmitters attempt to simultaneously access the same channel, and by establishing rules by which a transmitter provides reasonable opportunities for other transmitters to operate. Such protocols may consist of procedures for initiating new transmissions, procedures for determining the state of the channel (available or unavailable), and procedures for managing retransmissions in the event of a busy channel. CBPs include listen-before-talk (LBT), Aloha protocol, multiple access with collision avoidance (MACA), carrier sense multiple access (CSMA), distributed coordination function (DCF), point coordination function (PCF), and the derivatives/enhancements of these examples. Note that interference and collision are two terms used interchangeably within this document.

Listen-before-talk (LBT) and its variations have been adopted widely in wireless networks. Yet LBT have its drawbacks in high capacity networks or networks with similar characteristics. A high capacity network may implement high-gain, directional beamforming with massive number of antennas (typically realized with array antennas), which may increase a network's throughput while mitigating interference. Such new technologies in a high capacity wireless network are often collectively referred to as new radio (NR), and wireless networks implementing the NR technologies are often referred to as NR systems. The directional transmission in NR is the opposite to the legacy omni-directional transmission, and exposes drawbacks in LBT, including the following:

(1) Hidden node (also referred to as hidden terminal) problem. FIG. 1A illustrates a hidden node problem using LBT. The wireless network has two access nodes (ANs), AN1 and AN2 at references 102 and 104 respectively, and two user equipment (UEs), UE1 and UE2 at references 122 and 124 respectively. LBT is implemented for channel interference resolution. At task box 1, AN1 transmits data directionally and its transmission reaches UE1. Because the transmission by AN1 is directional, while AN2 is listening for another node's transmission at task box 2 when AN1 transmits, it can't detect AN1's transmission, thus it assumes that the channel shared with AN1 is free, and AN2 transmits data to its target node UE2. Yet because of the directional transmission of AN2 reaches not only the intended UE2 but also UE1, AN2's transmission interferes with AN1's transmission. Thus, for AN2, AN1 is a hidden node in its listening.

(2) Exposed node (also referred to as exposed terminal) problem. FIG. 1B illustrates an exposed node problem using LBT. The wireless networks also have the access nodes AN1-AN2 and UEs UE1-UE2. At task box 1, AN1 transmits data directionally and its transmission reaches not only the intended UE1, but also AN2. At task box 2, when AN2 has data to transmit to UE2, AN2 listens the channel and detects interference, and AN2 does not transmit to UE2. Yet since AN2 would transmit directionally to reach UE2, AN2's transmission would interfere little with AN1's transmission, and UE2 would be able to receive AN2's transmission, despite LBT indicates that there is a channel interference. Thus, LBT causes a false alarm. For AN2, AN1 is a (wrongly) exposed node using LBT.

(3) Deafness problem, where a receiver is unable to hear the directional transmission of its counterpart transmitter.

Listen-after-talk (LAT) may resolve the hidden node and exposed node problems. One reason of LBT's inefficiency is that in a high gain beamforming system such as a NR system, the difference between the sensed power at a source node and the interference power at the destination node is large. LBT relies on listening at the transmitter side to determine if there will be interference at the receiver side and thus large difference of power between them may result in severe problems. To solve it, LAT involves the receiver to sense the channel directly. Another motivation for LAT is the low interference environment in a high capacity network, where the sheer number of collisions for naïve direct transmissions is low. For this reason, LAT adopts a different logic compared to LBT, including: the default mode for transmitter is "to send" and data is not sent only when it is confirmed that channel is occupied by interfering transmissions. An important idea is that a source node transmits when data packets arrive and LAT solves interferences detected by the destination node. Yet, numerous challenges remain to resolve the interferences.

SUMMARY

Embodiments of the invention offer efficient ways to resolve channel interference in a wireless network using a coordination indicator for autonomous transmission. In a wireless network supporting autonomous transmission, a source network device transmits data when it detects the data are scheduled to transmit, without waiting for being granted a resource permission.

BRIEF DESCRIPTION OF THE DRAWINGS

The invention may best be understood by referring to the following description and accompanying drawings that illustrate embodiments of the invention. In the drawings.

DETAILED DESCRIPTION

Figure 1A:
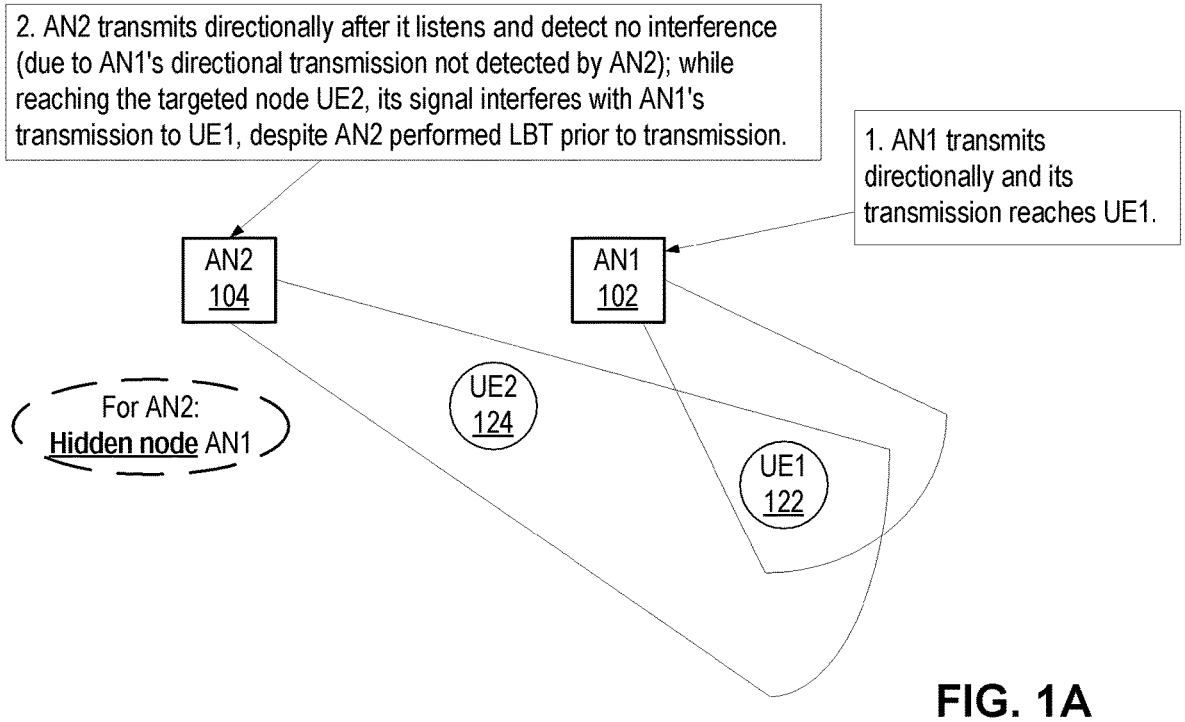
FIG. 1A illustrates a hidden node problem using listen-before-talk (LBT).
Figure 1B:
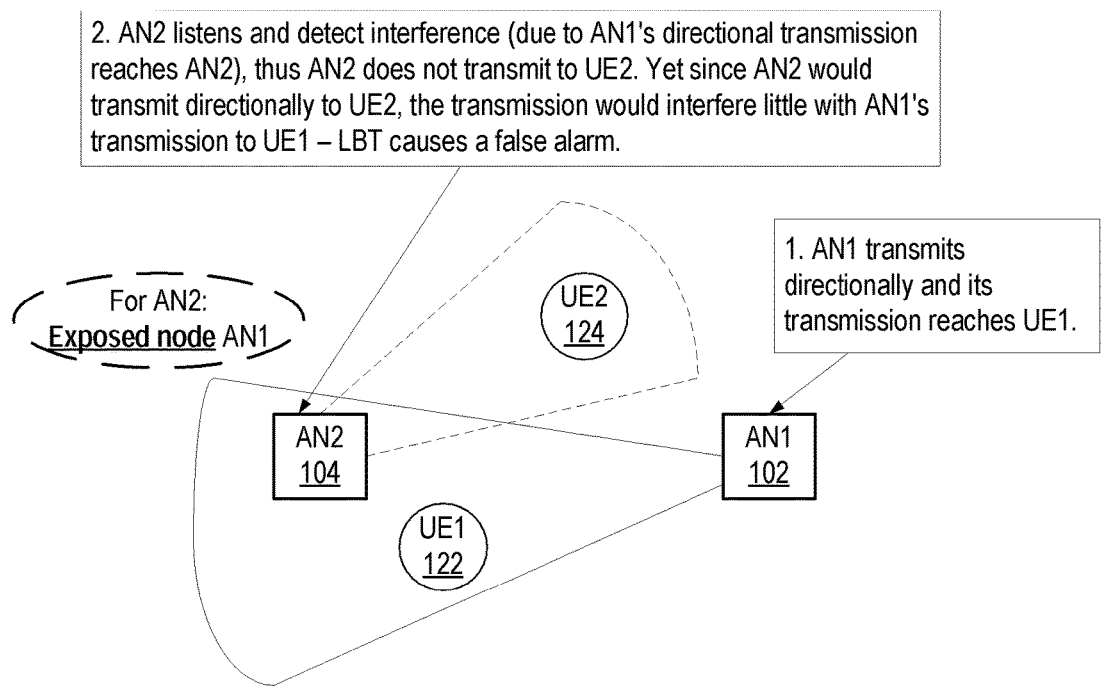
FIG. 1B illustrates an exposed node problem using LBT.

The following description describes methods, apparatus, and computer programs for autonomous transmission to resolve channel interference in a wireless communication network using a coordination indicator. In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. One skilled in the art will appreciate, however, that the invention may be practiced without such specific details. In other instances, control structures, gate level circuits and full software instruction sequences have not been shown in detail in order not to obscure the invention. Those of ordinary skill in the art, with the included descriptions, will be able to implement proper functionality without undue experimentation.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

Terms

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s)

in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the invention may be implemented using different combinations of software, firmware, and/or hardware.

A wireless communication network is a network of electronic devices communicating using radio waves (electromagnetic waves within the frequencies 30 KHz-300 GHz). A wireless communication may follow wireless communication standards, such as new radio (NR), LTE-Advanced (LTE-A), LTE, wideband code division multiple access (WCDMA), High-Speed Packet Access (HSPA). Furthermore, the communications between the electronic devices such as network devices and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. While LTE and NR are used as examples to describe embodiments of the invention, the invention may apply to other wireless communication networks, including LTE operating in unlicensed spectrums, Multefire system, IEEE 802.11 systems.

A network device (ND) (also referred to as a node, the two terms are used interchangeably in this document) is an electronic device in a wireless communication network via which a terminal device accesses the network and receives services therefrom. One type of network devices may refer to a base station (BS) or an access point (AP), for example, a node B (NodeB or NB), an evolved NodeB (eNodeB or eNB), a next generation node B (gNB), remote radio unit (RRU), a radio header (RH), a remote radio head (RRH), a relay, and a low power node such as a femtocell and a picocell.

Another type of network device is terminal devices that may access a wireless communication network and receive services from the wireless communication network. For example, a terminal device may be a user equipment (UE), which may be a subscriber station (SS), a portable subscriber Station, a mobile station (MS), or an access terminal (AT). The terminal device may be one of a mobile phone, a cellular phone, a smart phone, a tablet, a wearable device, a personal digital assistant (PDA), a portable computer, an image capture terminal device such as a digital camera, a gaming terminal device, a music storage and playback appliance, a vehicle-mounted wireless terminal device, a smart speaker, a set-top box.

Unlicensed spectrum includes spectrum that currently are not allocated/licensed to a dedicated use. NR systems may operate in both licensed and unlicensed spectrum, and spectrum sharing through a contention-based protocol (CBP) is applicable to both licensed and unlicensed spectrum. In some embodiments of a CBP, a network device may determine whether a channel is idle or occupied by detecting an energy level of the channel. When the energy level is over the threshold, the channel may be determined to be idle, otherwise it is busy.

Wireless Communication Network

Figure 2A:
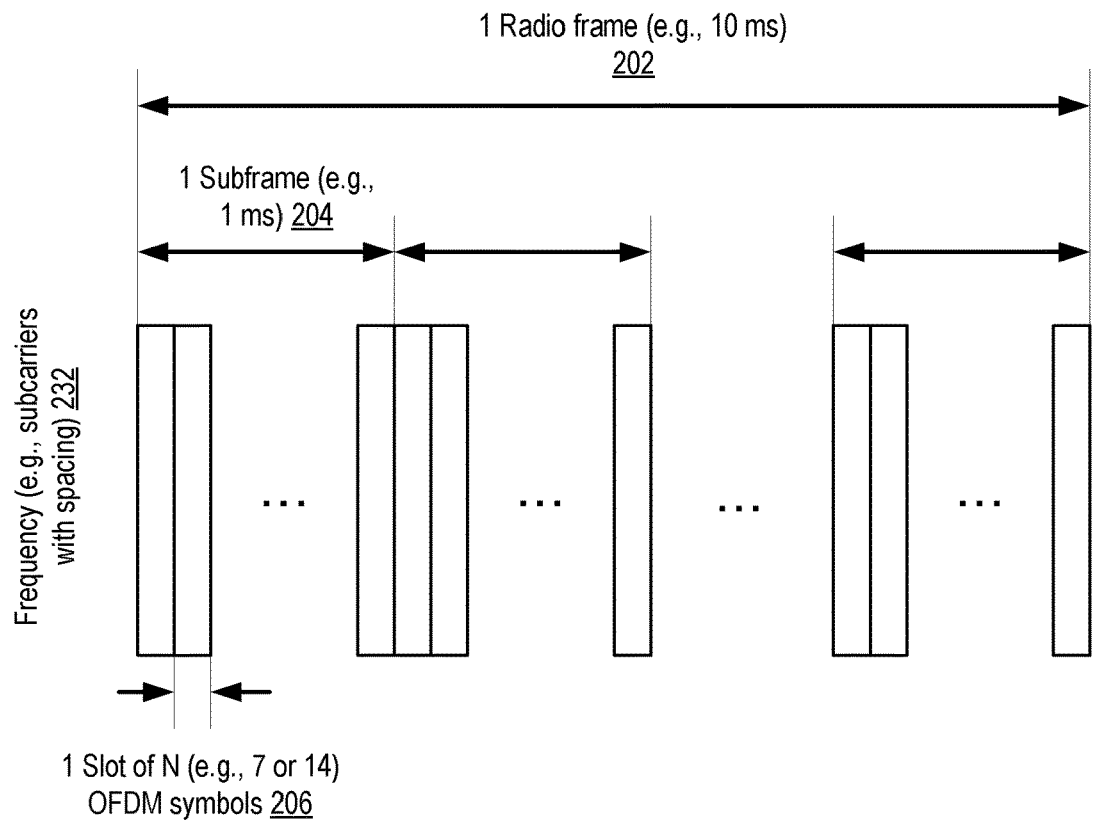
FIG. 2A illustrates an exemplary signal transmission hierarchy in a wireless network.

FIG. 2A illustrates an exemplary signal transmission hierarchy in a wireless network. The exemplary signal transmission hierarchy includes the transmission unit of frame such as radio frame 202. A radio frame 202 takes ten milliseconds to transmit in one embodiment. The frame may contain a number of subframes such as subframe 204. In this example, the radio frame 202 contains ten subframes, each takes one millisecond. Each subframe may contain a number of slots. For example, a subframe may contain two slots. Each slot such as the slot at reference 206 may contain a number of symbols. In one example, a slot contains either 7 or 14 symbols. The symbol is an orthogonal frequency-division multiplexing (OFDM) symbol in one embodiment.

The frame-subframe-slot-symbol hierarchy is an example of time domain hierarchy. In the frequency domain (as illustrated at reference 232), each symbol may be transmitted over a number of subcarriers. A symbol may be transmitted using a number of resource block (RB), each of which may contain 12 subcarriers in one embodiment. In one embodiment, each subcarrier includes a bandwidth (e.g., 7.5 kHZ or 15 kHZ) for transmission. One subcarrier x one symbol may be referred to as a resource element (RE), which is the smallest unit of resource to be allocated for signal transmission in one embodiment.

The illustrated frame structure offers an example for signal transmission. In this frame structure or other frame structures, data and signaling transmission is performed at a lowest level of time unit (symbol level in this case), which is included in a time unit (slot level in this example) a level over the lowest level of time unit in one embodiment. Data and signaling for one transmission from a source network device to a destination network device often use the same position within the signal transmission hierarchy, e.g., the same symbol position in consecutive slots (e.g., symbol #2 of each slot) or subframes, or in alternating slots (e.g., symbol #2 in every other slot) or subframes.

Figure 2B:
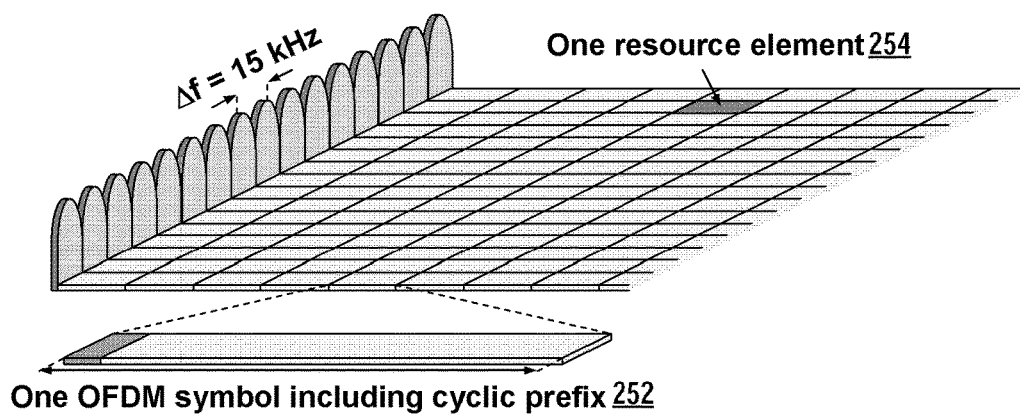
FIG. 2B illustrates resource elements used for data and signaling transmission.

FIG. 2B illustrates resource elements used for data and signaling transmission. The physical resources for transmission may be view as time and frequency grids as illustrated, where each resource element occupies a time period in the time domain and a frequency range in the frequency domain. Each OFDM symbol includes a cyclic prefix as illustrated at reference 252. Each OFDM symbol utilizes a number of resource elements. In this example, the sub-carrier spacing is 15 k Hz, and the resource element (RE) 252 occupies an orthogonal frequency-division multiplexing (OFDM) sub-carriers within an OFDM symbol. A network device may allocate some resource elements for a particular type of signaling. Such allocation may be specified through identifying the time period in the time domain and the frequency range in the frequency domain in a signal transmission hierarchy; or it may be specified through identifying specific resource elements within the signal transmission hierarchy.

For communication control through downlink signaling, a wireless network may use PDCCHs (physical downlink control channels) to transmit downlink control information (DCI), which provides downlink scheduling assignments and uplink scheduling grants. The PDCCHs are in general transmitted at the beginning of a slot and relate to data in the same or a later slot (for mini-slots PDCCH can also be transmitted within a regular slot). Different formats (sizes) of the PDCCHs are possible to handle different DCI payload sizes and different aggregation levels (i.e. different code rate for a given payload size). A UE is configured (implicitly and/or explicitly) to blindly monitor (or search) for a number of PDCCH candidates of different aggregation levels and DCI payload sizes. Upon detecting a valid DCI message (i.e. the decoding of a candidate is successful and the DCI contains a ID the UE is told to monitor) the UE follows the DCI (e.g. receives the corresponding downlink data or transmits in the uplink). The blind decoding process comes at a cost in complexity in the UE but is required to provide flexible scheduling and handling of different DCI payload sizes.

Different NR use-cases (e.g. MBB (mobile broadband), URLLC (ultra-reliable low latency communication)) require different control regions (e.g. time, frequency, numerologies etc.) & PDCCH configurations (e.g. operating points etc.) PDCCHs in NR are transmitted in configurable/dynamic control regions called control resource sets (CORESET) enabling variable use-cases. A CORESET is a subset of the downlink physical resource configured to carry control signaling. It is analogous to the control region in LTE but generalized in the sense that the set of physical resource blocks (PRBs) and the set of OFDM symbols in which it is located is configurable.

In one embodiment, CORESET configuration in frequency allocation is done in units of 6 RBs using NR DL resource allocation Type 0: bitmap of RB groups (RBGs). CORESET configuration in time spans of 1-3 consecutive OFDM symbols. For slot based scheduling, the CORESET span at the beginning of a slot is at most 2 if demodulation reference signal (DMRS) is located in OFDM Symbol (OS) #2 and is at most 3 if DMRS is located in OS #3. A UE monitors one or more CORESETs. Multiple CORESETs can be overlapped in frequency and time for a UE.

In one embodiment, a NR system may utilize unlicensed frequency bands ranging from 5 GHz, 37 GHz, to 60 GHz and implement the enhanced LAT implementations disclosed in this document.

Listen-after-Talk (LAT) and Fast Acknowledgment

Figure 3:
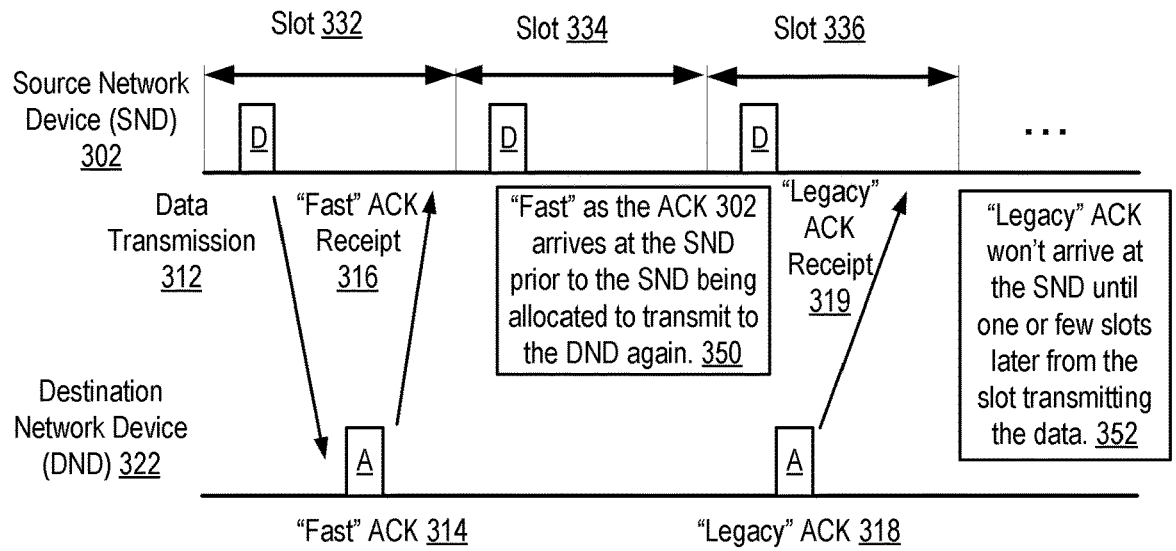
FIG. 3 illustrates listen-after-talk implementations in a wireless network per embodiments of the invention.

FIG. 3 illustrates listen-after-talk implementations in a wireless network per embodiments of the invention. In a simple listen-after-talk (LAT) implementation, a source network device (SND) 302 transmits its data to a destination network device 322, and then waits for an acknowledgement from the destination network device 322. Once the source network device 302 receives an acknowledgement indicating a successful transmission, it may transmit again. One issue with the LAT implementation is that the processing time of the data at the destination network device 322 can be long, and when the source network device 302 receives the acknowledgement from the destination network device 322, it has already missed the next allocated transmission time. For example, in a NR system where the subcarrier spacing is 120 KHz, one symbol is about 9 us, and the minimum time between a downlink transmission through a physical downlink shared channel (PDSCH) and its feedback to uplink is ~21 symbols, and that is longer than the time period of a 7-sybmol or 14-symbol slot.

In FIG. 3, data transmits from the source network device 302 at the same slot position in each slot (e.g., symbol #2 at slots 332-336). The source network device 302 transmits its data in slot 332 at reference 312. The destination network device 322 finishes processing the data and transmits the acknowledgement 318 back to source network device 302, which receives the acknowledge at reference 319. The transmission of an acknowledgement after data being processed is known in the art, and we refer it as "legacy" acknowledgement. The source network device 302 does not receives the legacy acknowledgement 318 until late part of slot 336, by which time the source network device 302 has missed two slots to transmit the data. Obviously the missing of allocated transmission position at the source network device 302 slows down its transmission rate and a user may no longer experience the high capacity of the wireless network as the line rate indicates.

One embodiment of the invention provides a fast acknowledgement 314. As illustrated at reference 350, the acknowledgement is fast in the sense that it arrives at the source network device 302 prior to the source network device 302 being allocated to transmit to the destination network device 322 again. Because the acknowledgment receipt at 316 happens before the data is scheduled for transmission in the next slot (slot 334), the data is transmitted at the high transmission rate provided by the wireless network. Thus, by using the fast acknowledgement, the throughput of the data in the network is high than that of a network using a legacy acknowledgement.

The destination network device 322 may provide the fast acknowledgment by estimating whether data is received and whether the data may be decoded successfully without completing the data processing of received data.

For example, when the destination network device 322 is a terminal device such as a user equipment, it knows that data is included in the received transmission from the source network device 302 when PDCCH with downlink assignment for the destination network device 322 is successfully decoded. Even when PDCCH is not detected, the destination network device 322 may predict whether data is transmitted by estimating the total energy in PDCCH part: if the total energy is significantly larger than the signaling power estimated based on historical information, the destination network device 322 may determine that strong interference may have distorted the PDCCH, and the PDCCH for the destination network device 322 has been transmitted. In a NR system, as the NR control resource set (CORESET) does not always occupy the entire operation bandwidth, the destination network device 322 may also estimate the presence of PDCCH by comparing received energy within the CORESET and that outside of the CORESET.

For another example, when the destination network device 322 is a base station, it may determine whether data is transmitted to it via detection of front-loaded demodulation reference signal (DMRS) if configured. Optionally the base station (e.g., an eNB or gNB) may determine that there is data transmitted to it according to another specific preamble designed with enhanced reliability at the head of uplink transmission. This specific preamble is to notify the base station that data has transmitted within the transmission signal.

The fast acknowledgement may be a positive one—the destination network device 322 detects data from the transmission signal and may decode the data successfully with a high probability. The fast acknowledgement may also be a negative one—the destination network device 322 detects data from the transmission signal yet can't decode the data successfully with a high probability (e.g., due to interference). The determination of whether the decoding will be successful does not require the decoding of the whole data; rather, one decoding a subset of data may be sufficient for the destination network device 322 to decide whether the probability of a successful decoding is high or not, and once the decision is made, the destination network device 322 may transmit the fast acknowledgement.

In one embodiment, the fast acknowledgment is indicted by one or more bits. For example, a bit value '1' may indicate an acknowledgment of no interference (meaning the interference is below an acceptable threshold thus the decoding is likely to be successful), while a bit value '0' may indicate an acknowledgement of interference, and the destination network device 322 may not decode the data successfully.

A wireless network may set an expected time period for the source network device 2032 to receive the acknowledgement. For example, the expected time period may be set to be the time period of one time slot. In that embodiment, once the acknowledgement is not received by the time the data is scheduled for transmission in the next slot, the source network device 302 assumes that the data transmitted to the destination network device 322 has been lost (e.g., due to interference), and the talk in the listen-after-talk has failed, and the source network device 302 will proceed with remedial measures discussed herein.

When no acknowledgement is received by the defined time period, the destination network device may predict that there is data transmitted during the time period, and it may store the received transmission in a buffer, and it continues monitoring and try to determine whether it actually have data received by combining newly obtained signal with the saved transmission.

By providing the fast acknowledgment, embodiments of the invention allow a listen-after-talk operates faster, since the fast acknowledgement allows the listen after the talk to be completed faster (e.g., prior to the time that the data is scheduled for transmission in the next slot).

Coordination Indicator and Resource Coordination Zone

Embodiments of the invention may use a coordination indicator to coordination interference resolution in a wireless network. The coordination indicator may be transmitted along with data from a source network device to a destination network device. The coordination indicator is specified for a source and destination network device pair (sometimes referred to as a link). The coordination indicator configures how and where to transmit coordination messages if needed.

Figure 4A:
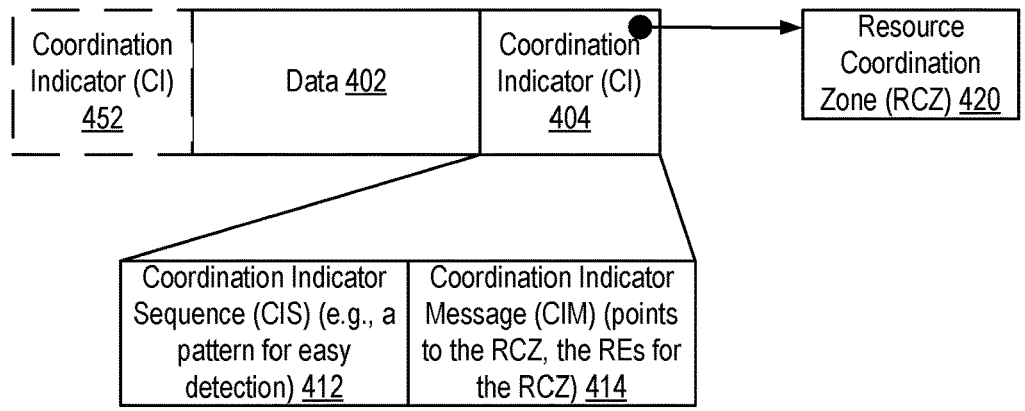
FIG. 4A illustrates implementations of a coordination indicator per embodiments of the invention.

FIG. 4A illustrates implementations of a coordination indicator per embodiments of the invention. The coordination indicator may be transmitted before or after its corresponding data as illustrated, where a coordination indicator 452 is transmitted before while an alternative coordination indicator 404 is transmitted after data 402. In some embodiments, transmitting the coordination indicator after the data is advantageous as the destination network device will attempt to decode the transmitted data first, and depending the data decoding status, the destination network device utilizes the coordination indicator.

In one embodiment, a coordinator indicator such as the coordination indicator 404 is specific to the source network device, and a network device receiving the coordination indicator may identify from which source network device that the coordination indicator is transmitted from. The coordination indicator 404 includes a coordination indicator sequence (CIS) 412 and a coordination indicator message (CIM) 414. The CIS 412 includes a bit sequence so that the receiving network device may identify that a coordinator indicator is detected. The CIS may reuse secondary synchronization sequence (SSS) or synchronization (SS) blocks.

The CIM 414 includes a message pointing to a resource coordination zone (RCZ) such as RCZ 420. The CIM 414 may indicate where the RCZ 420 is located in the time period and frequency range within the time and frequency grids as illustrated in FIG. 2B. The CIM 414 may also configure the messages that are to be transmitted within the RCZ. For example, the CIM 414 may configure how many resource elements to use by a message within the RCZ. The coordination indicator, through the CIM 414, acts as a pointer to point to the resource coordination zone so that the receiving network device knows where to send messages to resolve interference with the sending network device.

Figure 4B:
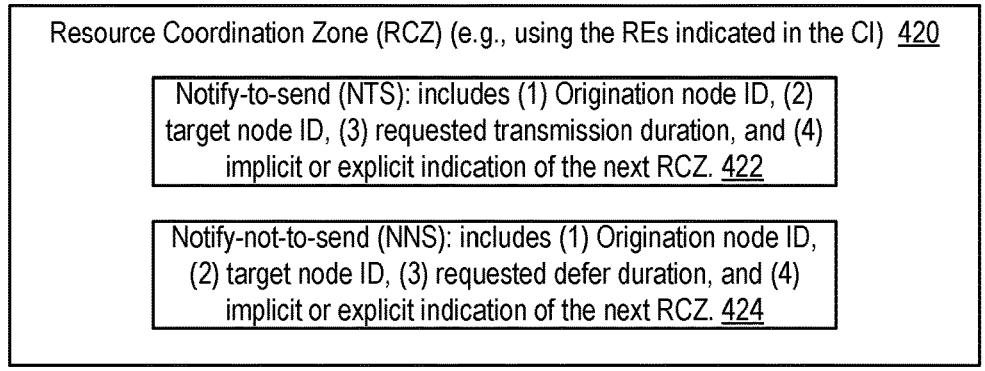
FIG. 4B illustrates the messages to be transmitted and detected in a resource coordination zone per embodiments of the invention.

FIG. 4B illustrates the messages to be transmitted and detected in a resource coordination zone per embodiments of the invention. The illustrated resource coordination zone is the RCZ 420, and messages communicated within the RCZ 420 uses the configuration defined in CIM 414 in one embodiment. In an alternative embodiment, the configuration of the messages is predefined and a network device does not refer to CIM 414 to understand the configuration of the messages within the RCZ 420.

The messages exchanged within the RCZ 420 includes a notify-to-send (NTS) and a notify-not-to-send (NNS) in one embodiment. In one embodiment, a NTS message such as the NTS 422 includes one or more of the following fields: (1) an origination node ID (OID) indicating where the NTS message is sent from; (2) a target node ID (TID) indicating where the NTS message is intended to reach; (3) a requested transmission duration indicating how long the intended transmission is expected to last; and (4) an implicit or explicit indication of the next RCZ where the receiving network device may resolve an interference/conflict with the origination node. When the next RCZ is predefined, the value within field (4) may be implicit (e.g., without value) or ignored. In some embodiments, values for one or more of fields (1)-(3) also take default values, and the fields/corresponding values may be omitted. A receiving node monitors the RCZ 420 and decodes values of these fields of an NTS message when the NTS message is detected. In some embodiments, values for one or more if fields (1)-(3) take default values, and the fields/corresponding values may be omitted.

An NTS message is transmitted from the origination node and it notifies the destination node to transmit in the indicated transmission duration. Additionally, the NTS message notifies the other source nodes (network devices) that are not the destination node to defer transmission in the indicated duration. In response to receiving the NTS message, a destination node (network device) may send an NNS to its source node to defer the source node's transmission.

An NNS message such as the NNS 424 includes one or more of the following fields: (1) an origination node ID (OID) indicating where the NNS message is sent from; (2) a target node ID (TID) indicating where the NNS message is intended to reach; (3) a requested transmission duration indicating how long the deference of transmission is expected to last; and (4) an implicit or explicit indication of the next RCZ where the receiving network device may resolve an interference/conflict with the origination node. Similar to NTS message, when the next RCZ is predefined, the value within field (4) may be implicit (e.g., without value) or ignored. In some embodiments, values for one or more of fields (1)-(3) also take default values, and the fields/corresponding values may be omitted. A receiving node monitors the RCZ 420 and decodes values of these fields of an NNS message when the NNS message is detected.

An NNS message notifies the target node specified in the target node field to defer (stop/halt) transmission for the indicated deference duration. Other receiving nodes that are not the target node may ignore the NNS message.

Figure 5A:
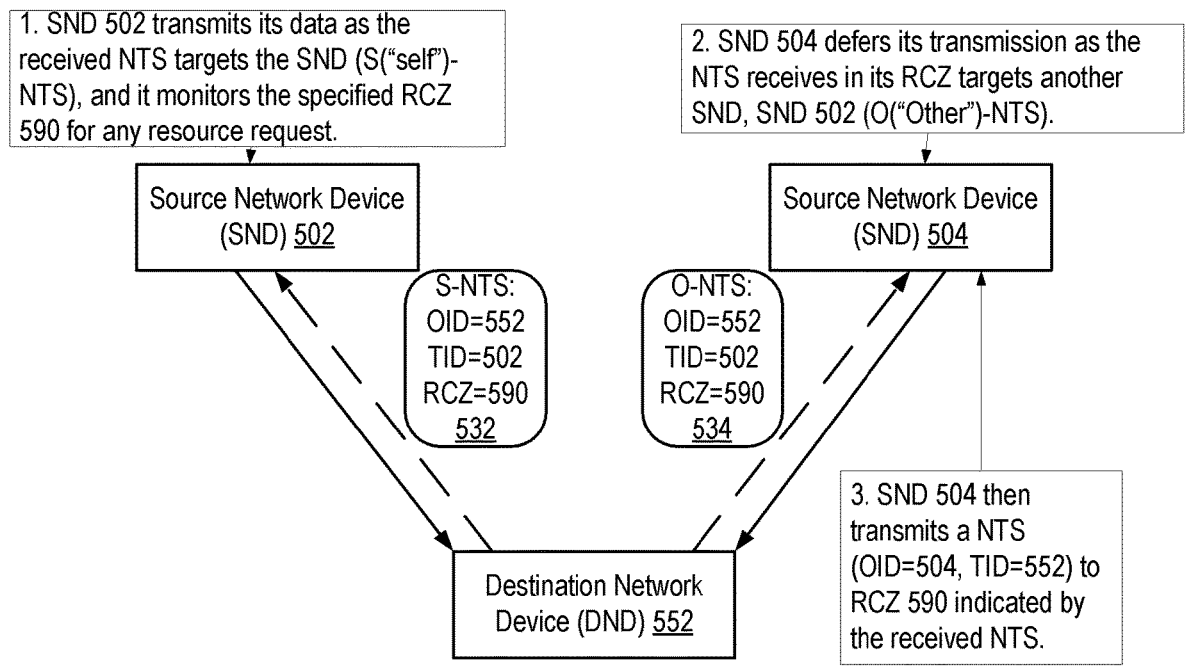
FIG. 5A illustrates the operations of a notify-to-send (NTS) message within a resource coordination zone per one embodiment of the invention.

FIG. 5A illustrates the operations of a notify-to-send (NTS) message within a resource coordination zone per one embodiment of the invention. The wireless network includes source network devices 502 and 504, and a destination network device 552. Data from the source network devices 502 and 504 are transmitted to the destination network device 552. The destination network device 552 sends out an NTS that is detected by both source network devices 502 and 504. An NTS (or an NNS) message being detected by multiple network devices is not uncommon in a wireless network because multiple network devices may monitor the same resource coordination zone.

The transmitted NTS 532 indicating (1) an origination node ID being 552, (2) a destination node ID being 502, and (3) the next RCZ is identified as RCZ 590. The requested transmission duration is absent and the source network device may take a default value. Upon receiving the NTS message, the source network device 502 recognizes that it is the target node of the NTS message, and it transmits its data in task box 1. The NTS may be referred to as a self-NTS (S-NTS) for the source network device 502. Additionally, it starts to monitor the specified RCZ 590 for any resource request by another network device as illustrated in task box 1.

The source network device 504 also receives the NTS. Yet the source network device 504 recognizes that it is not the targeted node, thus it defers its data transmission to the destination network device 552 in task box 2. For the source network device 504, the NTS may be referred to as an other-NTS (O-NTS) since the NTS targeted to another node. Upon deferring its data transmission, the source network device 504 may transmit another NTS in the specified RCZ 590 in task box 3 when the source network device 504 has more data to transmit after the deference. The other NTS indicates that it has data to transmit to the destination network device 552. Another network device, the source network device 502, which monitors the RCZ 590 (as described in task box 1), may detect the other NTS, and defer to the source network device 504 in the next transmission.

Figure 5B:
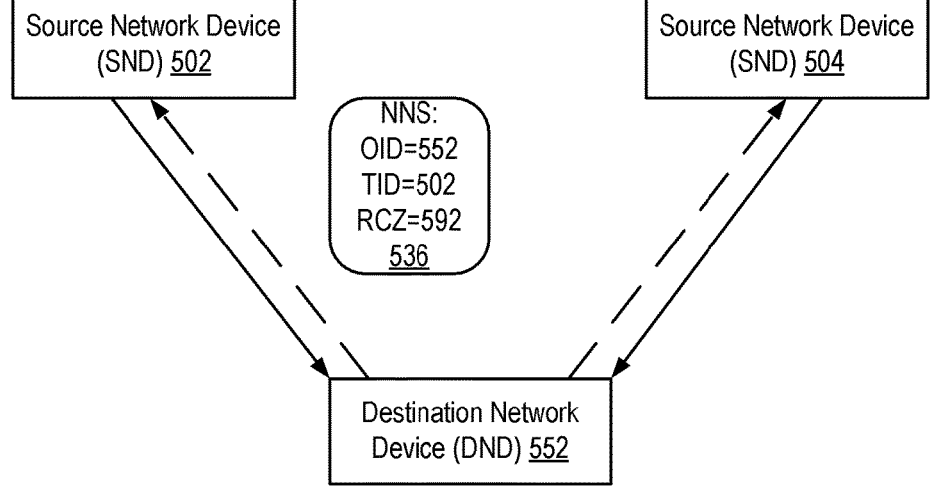
FIG. 5B illustrates the operations of a notify-not-to-send (NNS) message within a resource coordination zone per one embodiment of the invention.

FIG. 5B illustrates the operations of a notify-not-to-send (NNS) message within a resource coordination zone per one embodiment of the invention. The wireless network includes the same source network devices and destination network device as in FIG. 5A. The destination network device 552 sends out an NNS that is detected by both source network devices 502 and 504. The transmitted NNS 536 indicating (1) an origination node ID being 552, (2) a destination node ID being 502, and (3) the next RCZ is identified as RCZ 592. The requested transmission duration is absent and the source network device may take a default value. Upon receiving the NNS message, the source network device 502 recognizes that it is the target node of the NNS message, and it stops its data transmission to the destination network device 552. Additionally, if the source network device 504 has more data to transmit, it transmits a NTS to the RCZ 592 identified in the NNS 536. The NTS will notify the transmitting network device that source network device 504 plans to transmit and is in contention for transmission opportunity to the destination network device 552.

By exchanging the NTS and NNS messages in designated resource coordination zone, network devices that have data to transmit can coordinate with each other and share the same communication channel.

Autonomous Transmission

In some embodiments, a source network device transmits data autonomously without requiring being granted a resource permission (by a destination network device or another control/coordination unit). In a wireless network, a base station such as an eNB or gNB often transmit autonomously as it often controls the scheduling of data transmission in its communication with a terminal device such as a user equipment. A terminal device may also transmit autonomously. For example, in a NR system, a gNB may schedule via a semi-persistent scheduling (SPS) grant. That is, a user equipment may perform uplink data transmission autonomously using configured semi-persistent resources without the need of dynamic grant.

Figure 6:
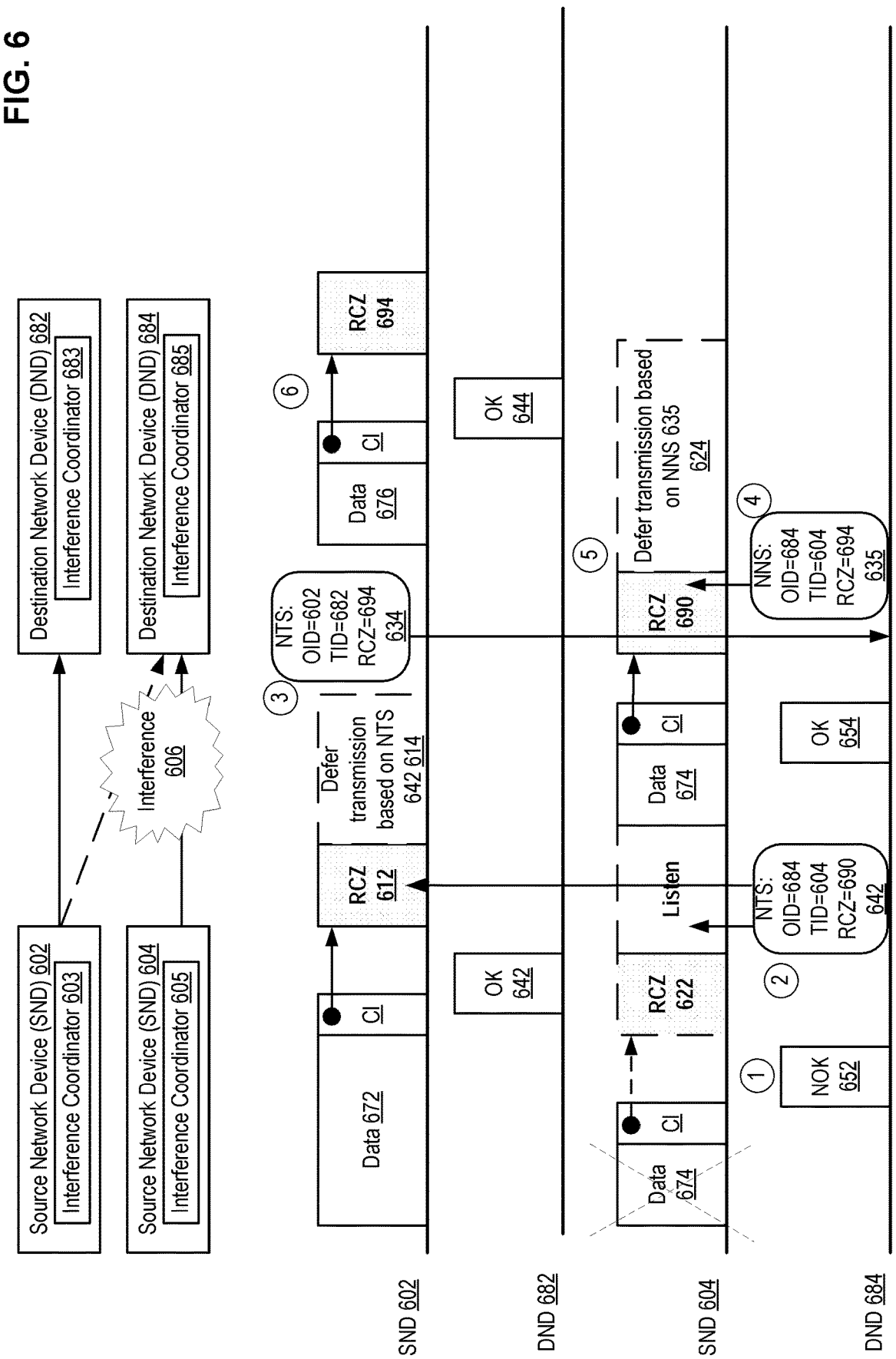
FIG. 6 illustrates the operations of using coordinator indicators to avoid channel interference per one embodiments of the invention.

FIG. 6 illustrates the operations of using coordinator indicators to avoid channel interference per one embodiments of the invention. The wireless network 600 includes two source network devices 602 and 604, and two destination network devices 682 and 684. While the source network device 602 aims at transmitting to the destination network device 682 and not the destination network device 684, its transmission interferes with the transmission of the source network device 604 to the destination network device 684, and results in interference 606. Each of the network devices includes an interference coordinator, including interference coordinator 603, 605, 683, and 685. In some embodiments, an interference coordinator in a source network device is configured to perform operations only for the source network device and the one in the destination network device is configured to perform operations only for the destination network device. In alternative embodiments, the interference coordinator in a network device may perform operations for both source and destination network device, as a network device may be a source for one communication channel while it is a destination for another communication channel, and the interference coordinator being configured to perform operations for both makes the network device more flexible. The circles 1-6 designate notable operations in utilizing coordination indicators to resolve channel interference.

At the beginning, both source network devices 602 and 604 transmits data and its respective coordination indicator. The coordination indicator for data 672 to be transmitted at the source network device 602 points to a resource coordination zone (RCZ) 612 and the coordination indicator for data 674 to be transmitted at the source network device 604 points to a RCZ 622. The destination network device 682 receives the transmitted data 672 without issue (as the top of the figure shows that the link between the two has no interference), thus an acknowledgement indicating no interference is issued by the destination network device 682, and that acknowledge is shown as an OK message at reference 642. In contrary, the destination network device 684 fails to receive the data transmission from the source network device 604 due to interference 606. Thus, the destination network device 684 issues an acknowledgement indicating interference, which is the NOK (not OK) message at reference 652, which designated using Circle 1.

While the destination network device 684 can't decode data 674, it listens to the channel between the source network device 604 and destination network device 684. In one embodiment, the destination network device knows that data are transmitted based on PDCCH or DMRS as discussed herein above relating to FIG. 3. In an alternative embodiment, it hears the coordination indicator transmitted by the source network device 604 and understands that the source network device 604 attempts to transmit data to itself. Additionally, it also hears the coordination indicator transmitted by the source network device 602 and understands that the resource coordination zone is RCZ 612. The destination network device 684 wants to announce that the source network device 604 plans to transmit data. Thus, at Circle 2, the destination network device 684 transmits an NTS 642 with OID=684, TID=604, and a new RCZ 690 indicated. The NTS 642 is transmitted to the RCZ 612 that is monitored by the source network device 602. Upon detecting the NTS 642, the source network device 602 then defers its transmission at reference 614. The source network device 604 also monitors for an NTS, and when it detects NTS 642, it realizes that NTS 642 is a S-NTS for itself, thus it starts to retransmit data 674.

Since the source network device 602 is deferring its transmission, interference 606 no longer exists, and data 674 now can be transmitted successfully to the source network device 604. Note that data 674 is transmitted with a coordinator indicator that points to RCZ 690, which is indicated in the received NTS 642.

At Circle 3, the source network device 602 still has data to transmit. The source network device 602 then sends a NTS 634 to notify its intent to transmit. The NTS has OID=602, TID=682, and a new RCZ 694 indicated. The NTS 634 is sent to RCZ 690, which is the RCZ indicated in the last NTS 642 it received. The destination network device 684 monitors RCZ 690 as it is the designated RCZ it indicated in the NTS 642 it sent out earlier.

At Circle 4, the destination network device 684 detects the NTS 634 and understands that the source network device 602 intends to transmit its data; then it transmits to RCZ 690 an NNS 635, which has OID=684, TID=604, and the RCZ 694 that the received NTS 634 indicates.

At Circle 5, the source network device 604 detects NNS 635, and defers its transmission based on NNS 635. At Circle 6, after sending the NTS 634, the source network device 602 transmits its further data 676 and its corresponding coordination indicator pointing to RCZ 694 as indicated in NTS 634 it sent earlier.

By using the coordination indicator pointing to a sequence of resource coordination zones and NTS/NNS messages, the source network devices 602 and 604 may get around channel interference such as interference 606 and allow both source network devices 602 and 604 to communicate and transmit traffic with their targeted destination network devices.

Operations of Some Embodiments

The operations in the flow diagram will be described with reference to the exemplary embodiments of the other figures. However, the operations of the flow diagram can be performed by embodiments of the invention other than those discussed with reference to the other figures, and the embodiments of the invention discussed with reference to these other figures can perform operations different than those discussed with reference to the flow diagram.

Figure 7:
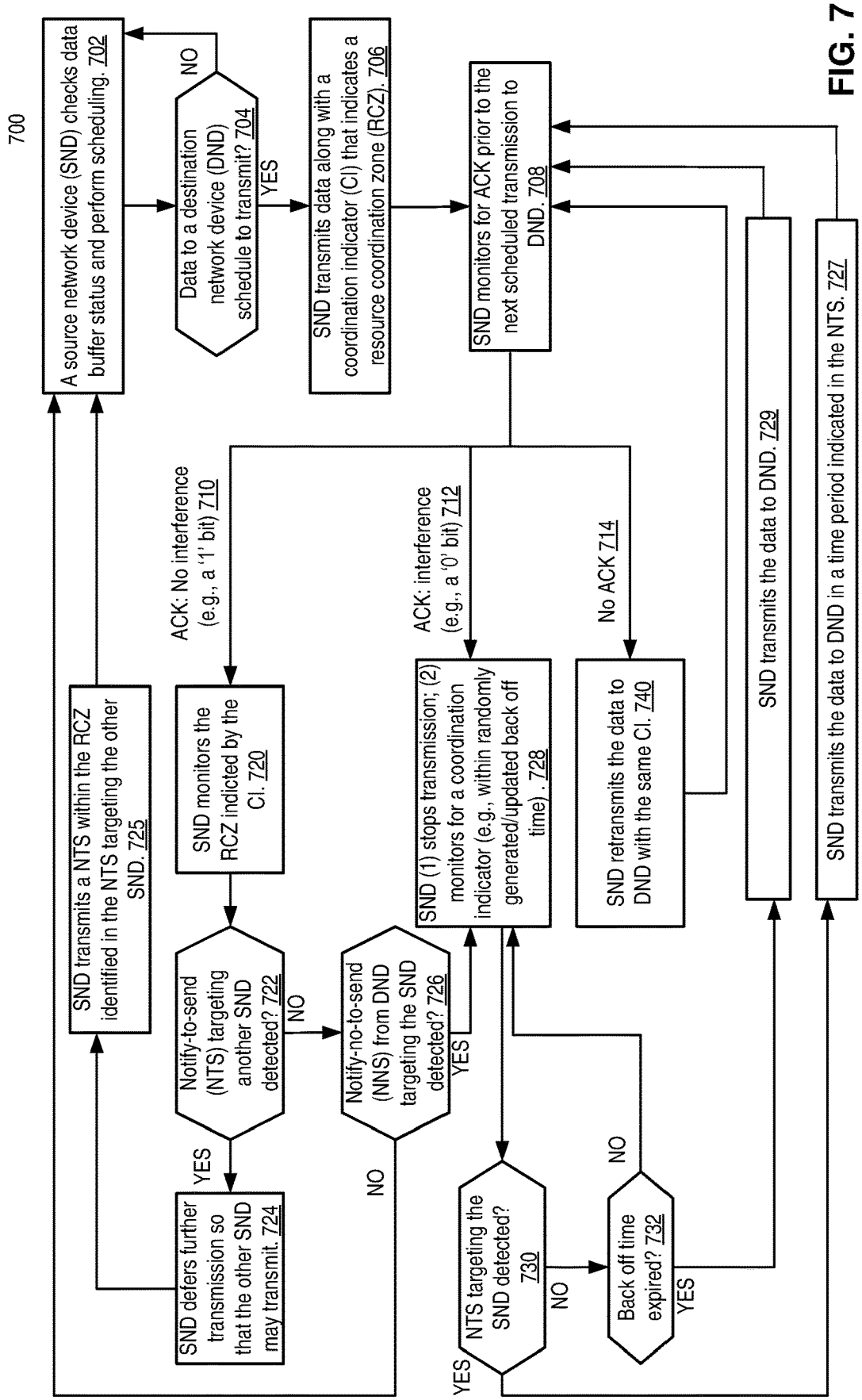
FIG. 7 illustrates operations of autonomous transmission by a source network device to resolve channel interference in a wireless network using a coordination indicator per one embodiment of the invention.

FIG. 7 illustrates operations of autonomous transmission by a source network device to resolve channel interference in a wireless network using a coordination indicator per one embodiment of the invention. The operations may be performed by an interference coordinator such as the interference coordinators 603 and 605 in the source network devices 602 and 604.

At reference 702, a source network device checks its data buffer status and perform scheduling. If the source network device determines that there are data to be scheduled to transmit to a destination network device at reference 704, the flow goes to reference 704, otherwise, the source network device continues waiting for data to be scheduled for transmission to the destination network device.

At reference 706, the source network device transmits the data to the destination network device, along with a coordination indicator that indicates a resource coordination zone. Note that in contrary to the listen-before-talk (LBT) protocol, the source network device does not listen and determine the transmission channel from the source network device to the destination network device is idle thus available to transmit first.

At reference 708, the source network device then monitors for an acknowledgment from the destination network device. The acknowledgement is a "fast" acknowledgement discussed herein above. The source network device expects to receive the acknowledgement prior to the next scheduled transmission (e.g., a symbol position in the next slot in a radio frame) of data to the destination network device).

At reference 710, an acknowledgment of no interference is received at reference 710 (and the acknowledgment may include a single bit value such as '1'). Then the flow goes to reference 720, and the source network device monitors the resource coordination zone indicated by the coordination indicator.

Then the source network device determines whether it detects a notify-to-send (NTS) message targeting another source network device at reference 722. The source network device also determines whether it detects a notify-not-to-send (NTS) from the source network device targeting the source network device at reference 726. If neither is detected, the flow goes back to reference 702, and the source network device is free to schedule next transmission.

If on the other hand, the source network device detects the NTS message targeting the other source network device (e.g., NTS 642 detected by the source network device 602), the flow goes to reference 724, and the source network defers further transmission so that the other source network device may transmit its data. The network device, however, will transmit an NTS message (e.g., NTS 634 transmitted by the source network device 602) indicating its intent to further transmission. The network device transmits the NTS message at reference 725 to the resource coordination zone identified in the NTS message received at reference 722. Then the flow goes back to reference 702 and the network device schedules for transmission of further data.

Additionally, if the source network device detects the NNS message from the destination network device targeting itself (e.g., the NNS 635 detected by the source network device 604), the flow goes to reference 728, where the network device stops its data transmission to the destination network device, and it monitors for a coordinator indicator in the communication channel between the source network device and the destination network device.

If an NTS message targeting the source network device is detected (e.g., the NTS 642 detected by the source network device 604) at reference 730, the source network device transmits its data to the destination network device in a time period indicated in the NTS at reference 727, and the source network device returns to monitoring state at reference 708.

At reference 728, a timer may be initiated at the start of monitoring, the timer value may be predetermined or randomly/pseudo-randomly generated. If the NTS message is not detected at reference 730, the source network device determines whether the timer expires at reference 732. If the timer is not expired, the monitoring continues at reference 728. Otherwise, the flow goes to reference 729, and the source network device transmits its data as discussed herein above.

If instead of receiving the acknowledgment indicating no interference, the network device receives the acknowledgment indicating interference at 712 (the acknowledgment may include a single bit value such as '0'), the flow goes to reference 728.

Additionally, if the source network device, at reference 714, detects no acknowledgement by the time that data is scheduled to be transmitted, the flow goes to reference 740, and the source network device retransmits its data to the destination network device with the same coordination indicator as the earlier transmitted data is assumed to be lost (due to interference).

Figure 8:
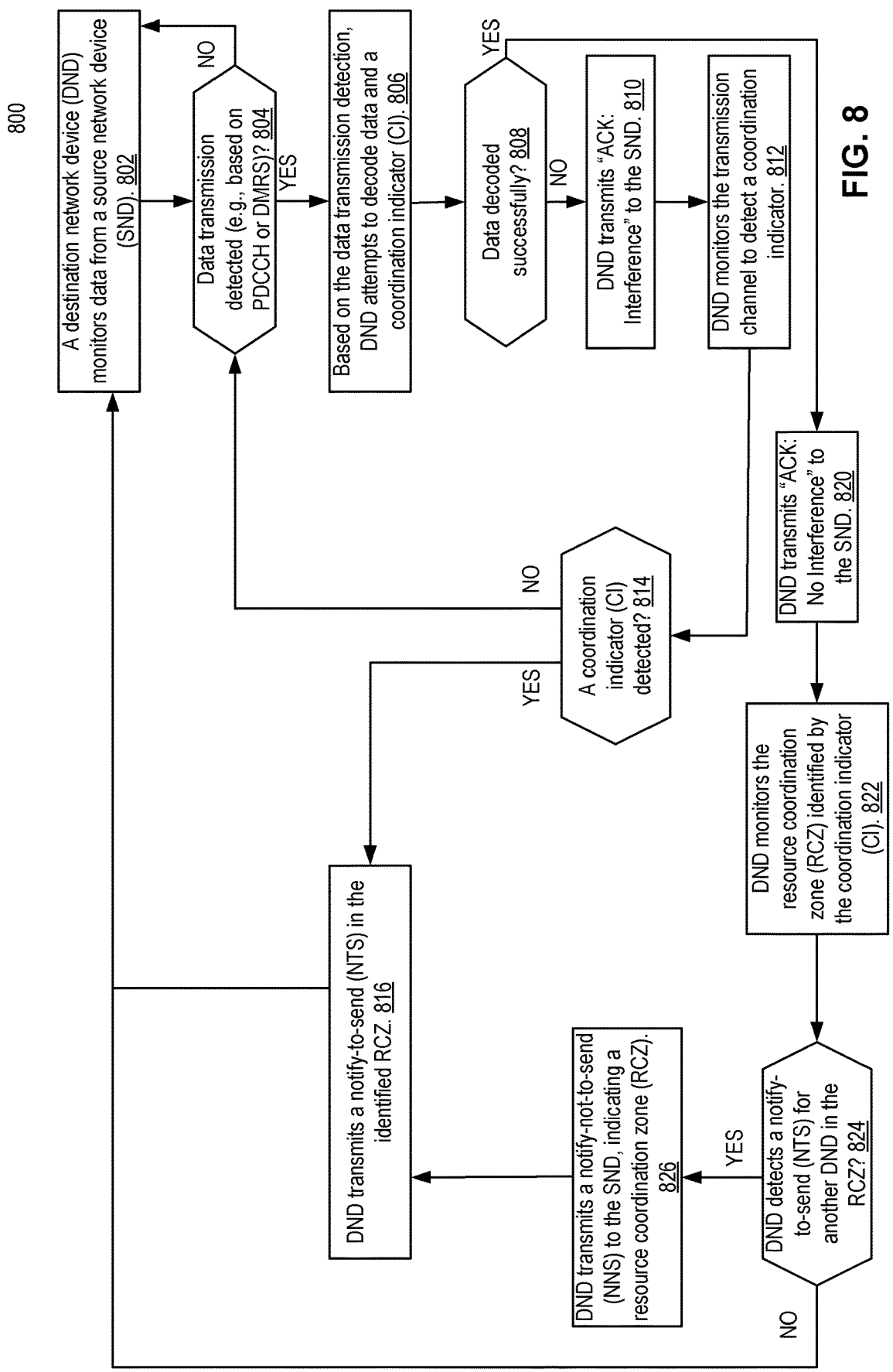
FIG. 8 illustrates operations of autonomous transmission by a destination network device to resolve channel interference in a wireless network using a coordination indicator per one embodiment of the invention.

FIG. 8 illustrates operations of autonomous transmission by a destination network device to resolve channel interference in a wireless network using a coordination indicator per one embodiment of the invention. The operations may be performed by an interference coordinator such as the interference coordinators 683 and 685 in the destination network devices 682 and 684.

At reference 802, a destination network device monitors data from a source network device. The destination network device examines the signal received from the source network device and determines whether a data transmission is detected at reference 804. The data transmission may be detected based on a PDCCH when the destination network device is a user equipment; and the data transmission may be detected based on a demodulation reference signal (DMRS) when the destination network device is a base station. If no data transmission is detected, the flow goes back to reference 802, otherwise the flow goes to reference 806.

At reference 806, the destination network device attempts to decode data and a coordination coordinator transmitted along with the data at reference 806. If data is decoded successfully as determined at reference 808, the flow goes to reference 820, where the destination network device transmits an acknowledge of no interference to the source network device. The destination network device then monitors the resource coordination zone identified by the coordination indicator at reference 822.

Then at reference 824, the destination network device determines whether it detects a NTS for another destination network device (e.g., the NTS 634 detected by the destination network device 684). If no such NTS is detected, the flow goes back to reference 802. Otherwise the destination network device transits an NNS to the source network device (e.g., the NNS 635 transmitting to the source network device 604) at reference 826.

Additionally, the destination network device transmits an NTS in identified resource coordinator zone at reference 816. Afterward, the flow goes back to reference 816.

Referring back to reference 808, when the data is not decoded successfully, the flow goes to reference 810, where the destination network device transmits an acknowledgement indicating interference to the source network device at reference 810. The flow then goes to reference 814, where it determines whether a coordination indicator is detected, if not, the flow returns to reference 804. Otherwise, the flow goes to reference 816, where a NTS is transmitted in the identified resource coordination zone (e.g., the NTS 642). After the operations in reference 816, the flow goes back to reference 802 as discussed herein above. Through operations within FIG. 8, the destination network device may continuously receive data from one or more source network devices and control which source network device transmits data to the destination network device. For example, through operations in references 824 and 826, the destination network device causes another source network device to send data to the destination network device. Furthermore, through operations in reference 816, the destination network device causes the source network device to get back the opportunity to transmit once the other source network device transmits its data in the specified time duration in the NNS message in reference 826.

Figure 9:
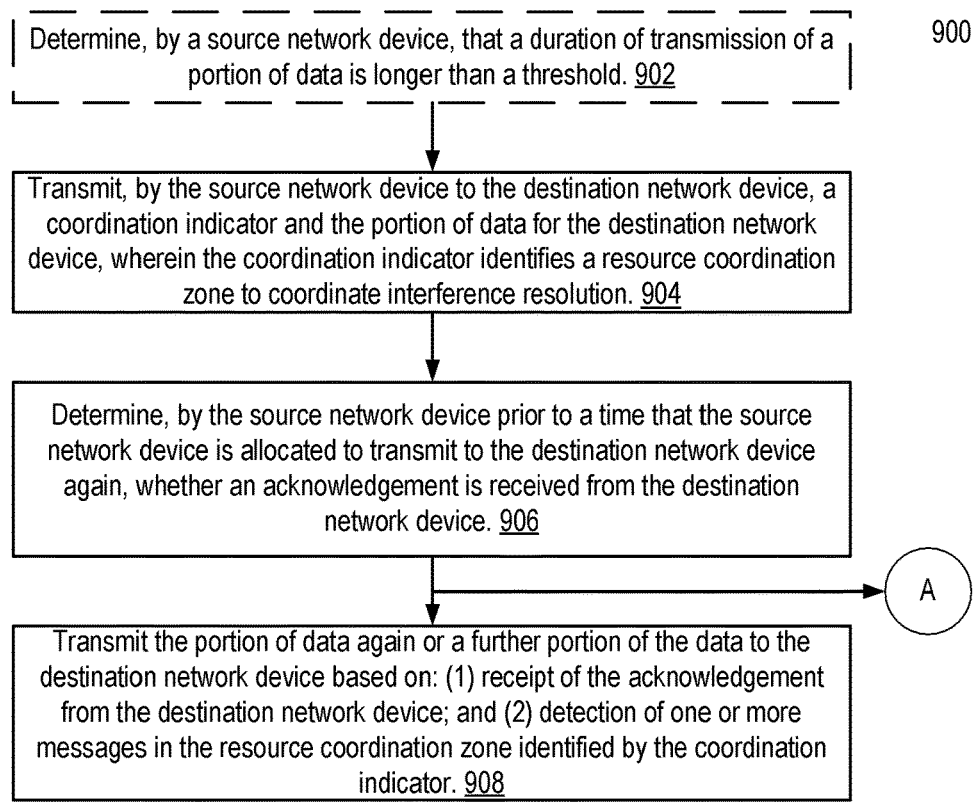
FIG. 9 is a flow diagram illustrating operations of autonomous transmission by a source network device to resolve channel interference in a wireless network using a coordination indicator per one embodiment of the invention.

FIG. 9 is a flow diagram illustrating operations of autonomous transmission by a source network device to resolve channel interference in a wireless network using a coordination indicator per one embodiment of the invention. The operations may be performed by an interference coordinator such as the interference coordinators 603 and 605 in the source network devices 602 and 604.

Optionally at reference 902, the source network device determines that a duration of transmission of the portion of data is longer than a threshold. When the data to be transmitted is lower than the threshold, performing the resource coordination using a coordination indicator may not be necessary and it may be more efficient by autonomously transmitting the portion of data autonomously without the coordination indicator.

At reference 904, the source network device transmits a coordination indicator and a portion of data for the destination network device to a destination network device. The coordination indicator identifies a resource coordination zone to coordinate interference resolution. FIG. 4A provides an example of the coordination indicator.

At reference 906, the source network device determines, prior to a time that the source network device is allocated to transmit to the destination network device again, whether an acknowledgement is received from the destination network device. FIG. 3 provides examples of the receipt of the acknowledgements.

At reference 908, the source network device transmits the portion of data again or a further portion of the data to the destination network device based on receipt of the acknowledgement from the destination network device and detection of one or more messages in the resource coordination zone identified by the coordination indicator.

In one embodiment, the portion of data is smaller in size than the further portion of the data. In one embodiment, the resource coordination zone uses a time period and a frequency range such as the resource element 254. In one embodiment, the coordination indicator further indicates resource elements for the interference resolution, and wherein a resource element uses a number of orthogonal frequency-division multiplexing (OFDM) subcarriers within an OFDM symbol.

In one embodiment, the source network device is one of an evolved node B (eNodeB) and a next generation node B (gNB), and the destination network device is a user equipment; or the source network device is the user equipment and the destination network device is the eNodeB or the gNB.

Figure 10:
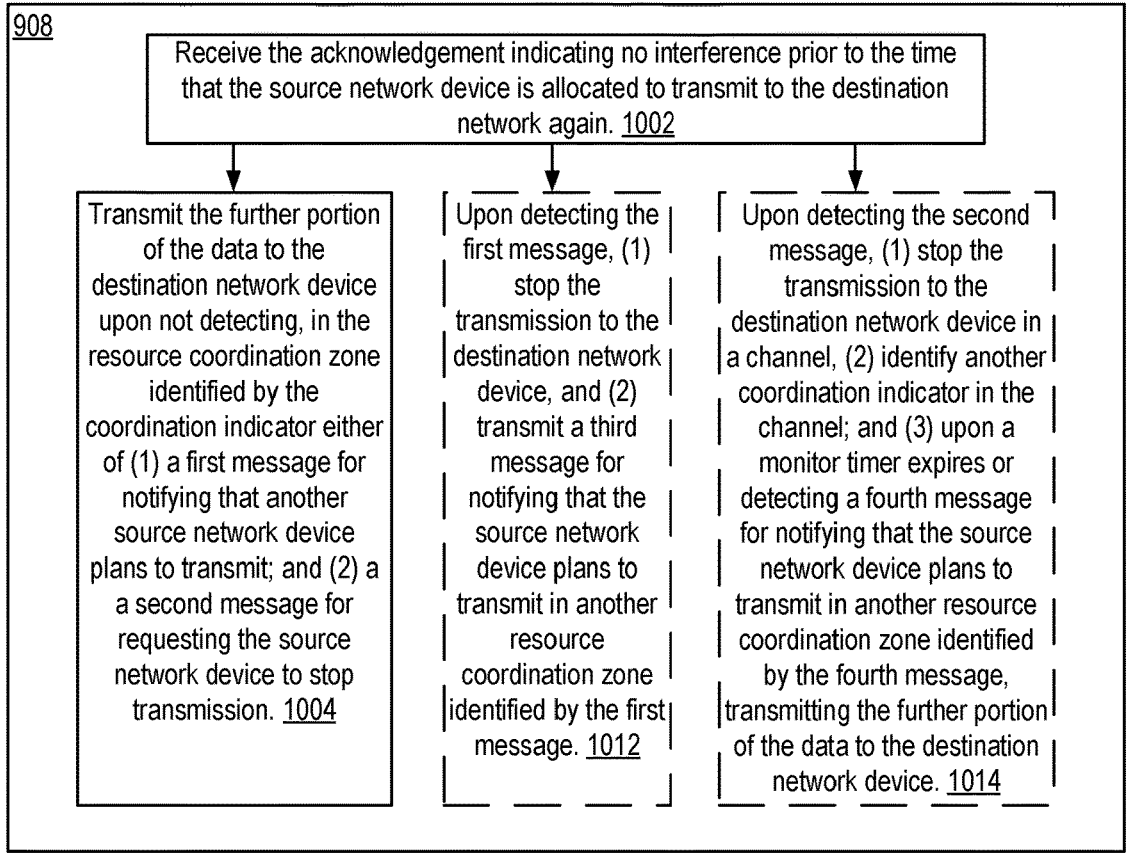
FIG. 10 illustrates operations of transmitting a further portion of data per one embodiment of the invention.

FIG. 10 illustrates operations of transmitting a further portion of data per one embodiment of the invention. The operations in FIG. 10 are within one embodiment of reference 908 in one embodiment.

At reference 1002, the source network device receives the acknowledgement indicating no interference prior to the time that the source network device is allocated to transmit to the destination network device again. Then at reference 1004, the source network device transmits the further portion of the data to the destination network device upon not detecting, in the resource coordination zone identified by the coordination indicator, either a first message for notifying that another source network device plans to transmit, or a second message for requesting the source network device to stop transmission. References 720, 722, and 726 are examples of the operations within reference 1004.

Optionally, at reference 1012, upon detect the first message, the source network device stops the transmission to the destination network device, and transmits a third message for notifying that the source network device plans to transmit in another resource coordination zone identified by the first message. References 722, 724, and 725 are examples of the operations within reference 1012.

Optionally, at reference 1014, upon detecting the second message, the source network device stops the transmission to the destination network device in a channel, and identifies another coordination indicator in the channel. Upon a monitor timer expires or detecting a fourth message for notifying the source network device to transmit in another resource coordination zone identified by the fourth message, the source network device transmits further portion of the data to the destination network device. References 726, 728, 730, 732, and 727 are examples of the operations within reference 1014.

Figure 11:
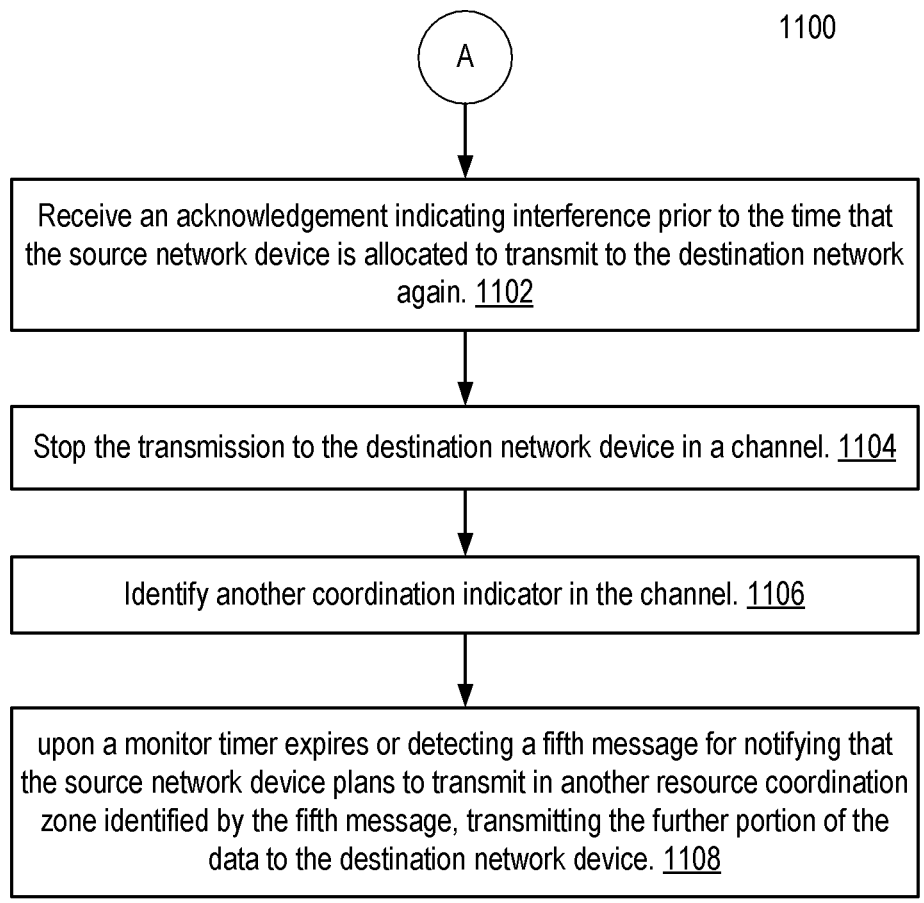
FIG. 11 is a flow diagram illustrating operations of autonomous transmission by a source network device when acknowledgment of interference is detected by the source network device per one embodiment of the invention.

FIG. 11 is a flow diagram illustrating operations of autonomous transmission by a source network device when acknowledgment of interference is detected by the source network device per one embodiment of the invention. Method 1100 is a continuation following reference 906 of FIG. 9 in one embodiment (illustrated by a Circle labelled "A").

At reference 1102, the source network device receives an acknowledgement indicating interference prior to the time that the source network device is allocated to transmit to the destination network again. References 712 is an example of operations within reference 1102. Then the source network device stops the data transmission to the destination network device in a channel (the communication channel between the source and destination network devices) at reference 1104, and the source network device identifies another coordination indicator in the channel. Reference 728 is an example of operations within references 1104 and 1106.

At reference 1108, upon a monitor timer expires or detecting a fifth message for notifying the source network device to transmit in another resource coordination zone identified by the fourth message, the source network device transmits the further portion of the data to the destination network device. References 730, 732, and 727 are examples of the operations within reference 1108.

Figure 12:
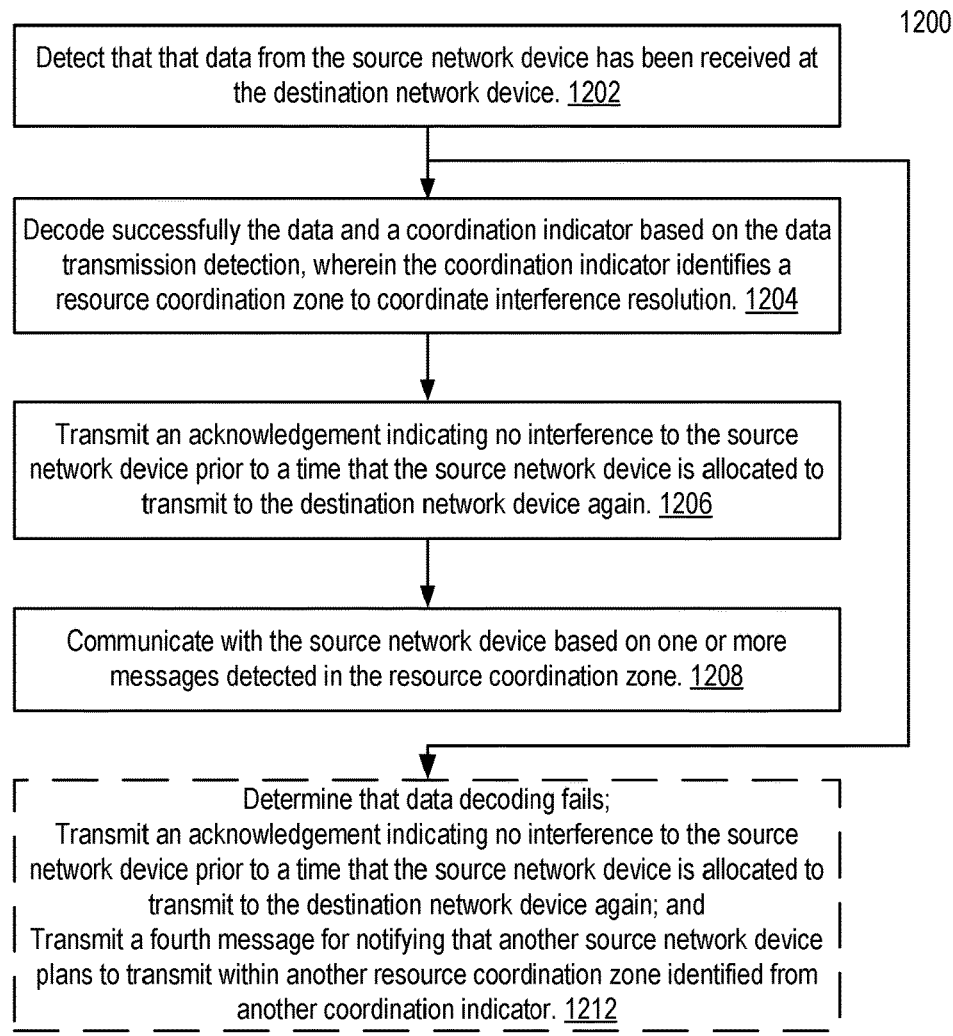
FIG. 12 is a flow diagram illustrating operations of autonomous transmission by a destination network device to resolve channel interference in a wireless network using a coordination indicator per one embodiment of the invention.

FIG. 12 is a flow diagram illustrating operations of autonomous transmission by a destination network device to resolve channel interference in a wireless network using a coordination indicator per one embodiment of the invention. The operations may be performed by an interference coordinator such as the interference coordinators 683 and 685 in the destination network devices 682 and 684.

At reference 1202, the destination network device detects that data from the source network device has been received at the destination network device. At reference 1204, the destination network device decodes successfully the data and a coordination indicator based on the data transmission detection, where the coordination indicator identifies a resource coordination zone to coordinate interference resolution.

At reference 1206, the destination network device transmits an acknowledgement indicating no interference to the source network device prior to a time that the source network device is allocated to transmit to the destination network device again. At reference 1208, the destination network device communicates with the source network device based on one or more messages detected in the resource coordination zone. In some embodiments, the message includes one or more of the first, the second, and the third messages discussed herein below.

Optionally at reference 1212, when the data decoding fails, the destination network device transmits an acknowledgement indicating interference to the source network device prior to a time that the source network device is allocated to transmit to the destination network device again. Reference 820 is an example of the acknowledgement. Then the destination network device transmits a fourth message for notifying that another source network device plans to transmit within another resource coordination zone identified from another coordination indicator. References 812, 814, and 816 are examples of the detection of the another resource coordination and transmitting the fourth message (an NTS in that case).

Figure 13:
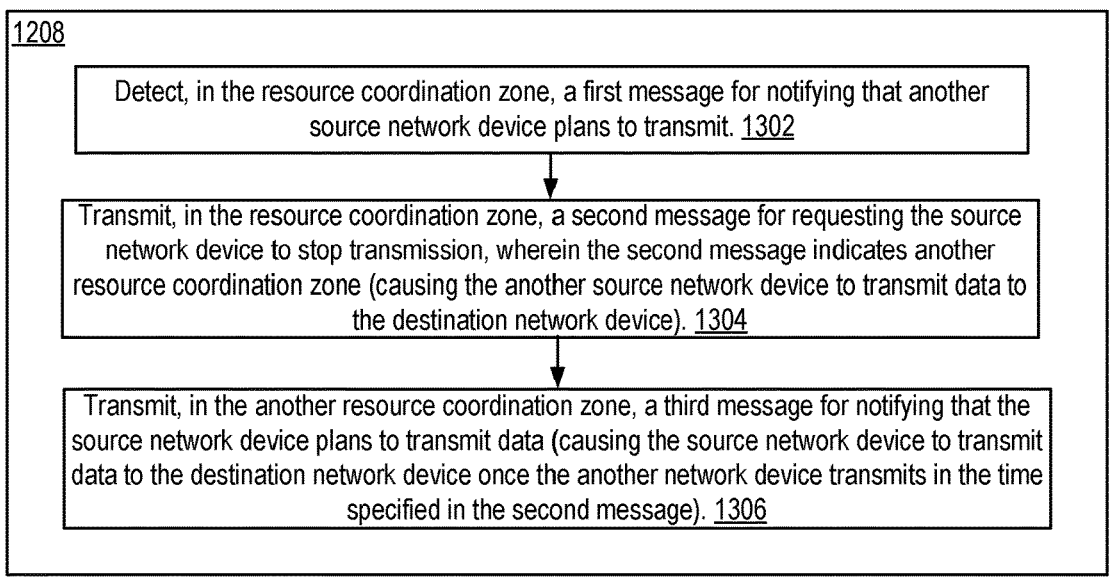
FIG. 13 is a flow diagram illustrating operations of the communicating by the destination network device based on one or more messages per one embodiment of the invention.

FIG. 13 is a flow diagram illustrating operations of the communicating by the destination network device based on one or more messages per one embodiment of the invention. Operations within FIG. 13 is an embodiment of reference 1208 in one embodiment.

At reference 1302, the destination network device detects, in the resource coordination zone, a first message for notifying that another source network device plans to transmit. The NTS in reference 824 is an example of the first message. At reference 1304, the destination network device transmits in the resource coordination zone, a second message for requesting the source network device to stop transmission, where the second message indicates another resource coordination zone. The NNS in reference 826 is an example of the second message. The transmission of the second message causes the another source network device to transmit data to the destination network device.

At reference 1306, the destination network device transmits, in the another resource coordination zone, a third message for notifying that the source network device plans to transmit data. The NTS in reference 816 is an example of the third message. The transmission of the third message causes the source network device to transmit data to the destination network device one the another network device transmits in the time specified in the second message.

Exemplary Deployments

Figure 14:
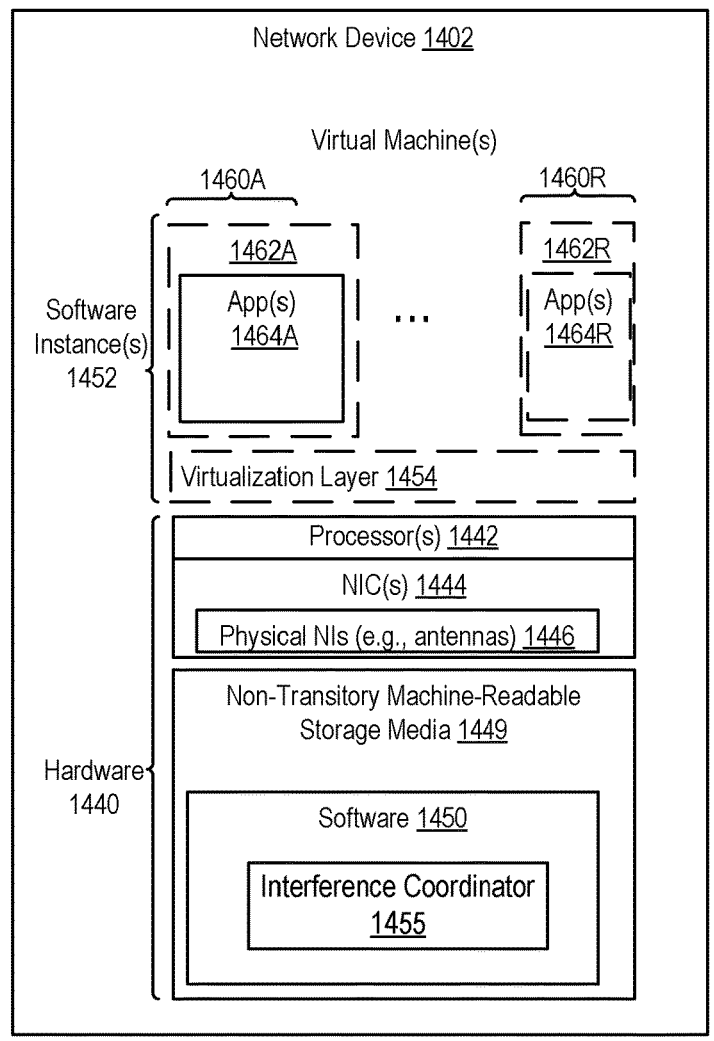
FIG. 14 illustrates a network device per one embodiment of the invention.

FIG. 14 illustrates a network device per one embodiment of the invention. The network device 1402 may be a source network device such as source network devices 602 and 604 or a destination network device such as the destination network devices 682 and 684. The network device 1402 may be implemented using custom application-specific integrated-circuits (ASICs) as processors and a special-purpose operating system (OS), or common off-the-shelf (COTS) processors and a standard OS.

The network device 1402 includes hardware 1440 comprising a set of one or more processors 1442 (which are typically COTS processors or processor cores or ASICs) and physical NIs 1446, as well as non-transitory machine-readable storage media 1449 having stored therein software 1450. During operation, the one or more processors 1442 may execute the software 1450 to instantiate one or more sets of one or more applications 1464A-R. While one embodiment does not implement virtualization, alternative embodiments may use different forms of virtualization. For example, in one such alternative embodiment the virtualization layer 1454 represents the kernel of an operating system (or a shim executing on a base operating system) that allows for the creation of multiple instances 1462A-R called software containers that may each be used to execute one (or more) of the sets of applications 1464A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment the virtualization layer 1454 represents a hypervisor (sometimes referred to as a virtual machine monitor (VMM)) or a hypervisor executing on top of a host operating system, and each of the sets of applications 1464A-R run on top of a guest operating system within an instance 1462A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1440, directly on a hypervisor (in which case the unikernel is sometimes described as running within a LibOS virtual machine), or in a software container, embodiments can be implemented fully with unikernels running directly on a hypervisor represented by virtualization layer 1454, unikernels running within software containers represented by instances 1462A-R, or as a combination of unikernels and the above-described techniques (e.g., unikernels and virtual machines both run directly on a hypervisor, unikernels and sets of applications that are run in different software containers).

The software 1450 contains an interference coordinator 1455. The interference coordinator 1455 may be one or more of the interference coordinators 603, 605, 683, and 685. The interference coordinator 1455 may perform operations in the one or more of exemplary methods 700-900 and 1100-1200, described with reference to earlier figures. The instantiation of the one or more sets of one or more applications 1464A-R, as well as virtualization if implemented, are collectively referred to as software instance(s) 1452. Each set of applications 1464A-R, corresponding virtualization construct (e.g., instance 1462A-R) if implemented, and that part of the hardware 1440 that executes them (be it hardware dedicated to that execution and/or time slices of hardware temporally shared), forms a separate virtual network device 1460A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). The physical network interface 1446 may include one or more antenna of the network device 1402. An antenna port may or may not correspond to a physical antenna.

Figure 15:
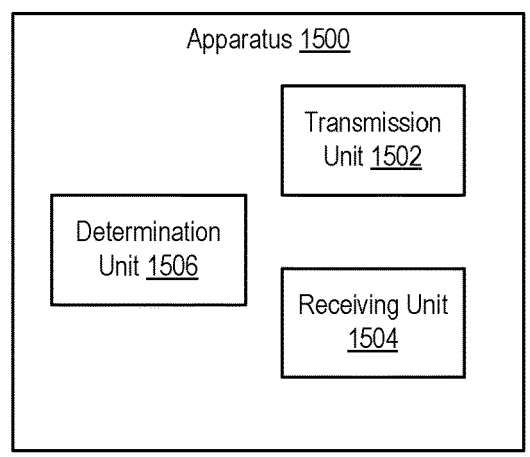
FIG. 15 illustrates a schematic block diagram of an apparatus in a wireless communication network for communicating between network devices per one embodiment of the invention.

FIG. 15 illustrates a schematic block diagram of an apparatus 1500 in a wireless communication network for communicating between network devices (e.g., network devices 602, 604, 682, and 684) per one embodiment of the invention. The apparatus may be implemented as/in a network device, e.g., one of the network devices 602, 604, 682, and 684. The apparatus 1500 is operable to carry out the exemplary method 700-900 and 1100-1200 described with reference to earlier figures.

The apparatus 1500 includes a transmission unit 1502, a receiving unit 1504, and a determination unit 1506. In one embodiment, the transmission unit 1902 performs operations relating to transmitting data and NTS/NNS messages when the apparatus 1500 includes a source network device; the receiving unit 1504 perform operations relating to receiving acknowledgment from the destination network device; and the determination unit 1506 determines data transmission and receiving the acknowledgments.

In one embodiment, the transmission unit 1902 performs operations relating to transmitting NTS/NNS messages when the apparatus 1500 includes a destination network device; the receiving unit 1504 perform operations relating to receiving data from a source network device; and the determination unit 1506 determines message transmission and data receiving.

Some Embodiments of the Invention

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The following is a list of embodiments:

1. A method implemented in a source network device for transmitting data to a destination network device in a wireless network, the method comprising:
  transmitting (904), by the source network device to the destination network device, a coordination indicator and a portion of data for the destination network device, wherein the coordination indicator identifies a resource coordination zone to coordinate interference resolution;
  determining (906), by the source network device prior to a time that the source network device is allocated to transmit to the destination network device again, whether an acknowledgement is received from the destination network device; and
  transmitting (908) the portion of data again or a further portion of the data to the destination network device based on:
    receipt of the acknowledgement from the destination network device, and
    detection of one or more messages in the resource coordination zone identified by the coordination indicator.

2. The method of embodiment 1, further comprising:
  Determining (902), by the source network device, that a duration of transmission of the portion of data is longer than a threshold, prior to transmitting the coordination indicator along with the data.

3. The method of embodiment 1 or 2, wherein the portion of data is smaller in size than the further portion of the data.

4. The method of any of embodiments 1 to 3, wherein the resource coordination zone uses a time period and a frequency range.

5. The method of any of embodiments 1 to 4, wherein the coordination indicator further indicates resource elements for the interference resolution, and wherein a resource element uses a number of orthogonal frequency-division multiplexing (OFDM) subcarriers within an OFDM symbol.

6. The method of any of embodiments 1 to 5, wherein the transmitting the further portion of the data to the destination network device comprises:
receiving (1002) the acknowledgement indicating no interference prior to the time that the source network device is allocated to transmit to the destination network again;
transmitting (1004) the further portion of the data to the destination network device upon not detecting, in the resource coordination zone identified by the coordination indicator, either of:
 a first message for notifying that another source network device plans to transmit, and
 a second message for requesting the source network device to stop transmission.

7. The method of any of embodiments 1 to 6, further comprising:
upon detecting the first message,
 stopping (1012) the transmission to the destination network device, and
 transmitting (1012) a third message for notifying that the source network device plans to transmit in another resource coordination zone identified by the first message.

8. The method of any of embodiments 1 to 7, further comprising:
upon detecting the second message,
 stopping (1014) the transmission to the destination network device in a channel;
 identifying (1014) another coordination indicator in the channel;
 upon that a monitor timer expires or detecting a fourth message for notifying that the source network device plans to transmit in another resource coordination zone identified by the fourth message, transmitting (1014) the further portion of the data to the destination network device.

9. The method of any of embodiments 1 to 8, wherein the transmitting the further portion of the data to the destination network device comprises:
receiving (1102) the acknowledgement indicating interference prior to the time that the source network device is allocated to transmit to the destination network again;
stopping (1104) the transmission to the destination network device in a channel;
identifying (1106) another coordination indicator in the channel;
upon a monitor timer expires or detecting a fourth message for notifying that the source network device plans to transmit in another resource coordination zone identified by the fourth message, transmitting (1108) the further portion of the data to the destination network device.

10. The method of any of embodiments 1 to 9, wherein the source network device is one of an evolved node B (eNodeB) and a next generation node B (gNB), and the destination network device is a user equipment; or the source network device is the user equipment and the destination network device is the eNodeB or the gNB.

11. A non-transitory machine-readable storage medium (1449) that provides instructions, which when executed by a processor of a network device, cause the processor to perform methods 1-10.

12. A network device to transmit data to another network device in a wireless network, the network device comprising:
a non-transitory machine-readable storage medium (1449) to store instructions; and
a processor (1442) coupled with the non-transitory machine-readable storage medium (1449) to process the stored instructions, causing the network device to perform operations comprising:
 transmitting (904), by the network device to the another network device, a coordination indicator and a portion of data for the another network device, wherein the coordination indicator identifies a resource coordination zone to coordinate interference resolution;
 determining (906), by the network device prior to a time that the network device is allocated to transmit to the another network device again, whether an acknowledgement is received from the another network device; and
 transmitting (908) the portion of data again or a further portion of the data to the another network device based on:
 receipt of the acknowledgement from the another network device, and
 detection of one or more messages in the resource coordination zone identified by the coordination indicator.

13. A method implemented in a destination network device in a wireless network, wherein a source network device transmits data to a destination network device, the method comprising:
detecting (1202) that data from the source network device has been received at the destination network device;
decoding (1204) successfully the data and a coordination indicator based on the data transmission detection, wherein the coordination indicator identifies a resource coordination zone to coordinate interference resolution;
transmitting (1206) an acknowledgement indicating no interference to the source network device prior to a time that the source network device is allocated to transmit to the destination network device again; and
communicating (1208) with the source network device based on one or more messages detected in the resource coordination zone.

14. The method of embodiment 13, wherein the destination network device is a user equipment (UE), and wherein the data transmission is detected based on a a physical downlink control channel (PDCCH).

15. The method of embodiment 13 or 14, wherein the destination network device is one of an evolved node B (eNodeB) and a next generation node B (gNB), and wherein the data transmission is detected based on a detection of a demodulation reference signal (DMRS).

16. The method of any of embodiments 13-15, wherein the resource coordination zone includes a time period and a frequency range.

17. The method of any of embodiments 13-17, wherein the coordination indicator further indicates resource elements for the interference resolution, and wherein a resource element uses a number of orthogonal frequency-division multiplexing (OFDM) subcarriers within an OFDM symbol.

18. The method of any of embodiments 13-17, wherein communicating with the source network device comprises:

detecting (1302), in the resource coordination zone, a first message for notifying that another source network device plans to transmit;

transmitting (1304), in the resource coordination zone, a second message for requesting the source network device to stop transmission, wherein the second message indicates another resource coordination zone; and transmitting (1306), in the another resource coordination zone, a third message for notifying that the source network device plans to transmit data.

19. The method of any of embodiments 13-18, further comprising:

determining (1212) that data decoding fails;

transmitting (1212) an acknowledgement indicating interference to the source network device prior to a time that the source network device is allocated to transmit to the destination network device again;

transmitting (1212) a fourth message for notifying that another source network device plans to transmit within another resource coordination zone identified from another coordination indicator.

20. A non-transitory machine-readable storage medium (1449) that provides instructions, which when executed by a processor of a network device, cause the processor to perform methods 13-19.

21. A network device to receive data from another network device in a wireless network, the network device comprising:

a non-transitory machine-readable storage medium (1449) to store instructions; and a processor (1442) coupled with the non-transitory machine-readable storage medium (1449) to process the stored instructions, causing the network device to perform operations comprising:

detecting (1202) that data from the another network device has been received at the network device;

decoding (1204) successfully the data and a coordination indicator based on the data transmission detection, wherein the coordination indicator identifies a resource coordination zone to coordinate interference resolution;

transmitting (1206) an acknowledgement indicating no interference to the another network device prior to a time that the another network device is allocated to transmit to the network device again; and communicating (1208) with the another network device based on one or more messages detected in the resource coordination zone.

What is claimed is:

1. A method implemented at a source network device for transmitting data to a destination network device in a wireless network, the method comprising:

transmitting to the destination network device, a coordination indicator and a portion of data for the destination network device, wherein the coordination indicator identifies a resource coordination zone to coordinate interference resolution;

determining prior to a time that the source network device is allocated to transmit to the destination network device again, whether an acknowledgement is received from the destination network device; and transmitting the portion of data again or a further portion of the data to the destination network device based on:
receipt of the acknowledgement from the destination network device, and
detection of one or more messages in the resource coordination zone identified by the coordination indicator.

2. The method of claim 1, further comprising:
determining, prior to transmitting the coordination indicator along with the data, that a duration of transmission of the portion of data is longer than a threshold.

3. The method of claim 1, wherein the portion of data is smaller in size than the further portion of the data.

4. The method of claim 1, wherein the coordination indicator further indicates resource elements for the interference resolution, and wherein a resource element uses a number of orthogonal frequency-division multiplexing (OFDM) subcarriers within an OFDM symbol.

5. The method of claim 1, wherein the transmitting the further portion of the data to the destination network device comprises:

receiving the acknowledgement indicating no interference prior to the time that the source network device is allocated to transmit to the destination network device again; and transmitting the further portion of the data to the destination network device upon not detecting, in the resource coordination zone identified by the coordination indicator, either of:
a first message for notifying that another source network device plans to transmit, and
a second message for requesting the source network device to stop transmission.

6. The method of claim 5, further comprising:
upon detecting the first message,
stopping the transmission to the destination network device, and
transmitting a third message for notifying that the source network device plans to transmit in another resource coordination zone identified by the first message.

7. The method of claim 5, further comprising:
upon detecting the second message,
stopping the transmission to the destination network device in a channel;
identifying another coordination indicator in the channel; and
upon that a monitor timer expires or detecting a fourth message for notifying the source network device to transmit in another resource coordination zone identified by the fourth message, transmitting the further portion of the data to the destination network device.

8. The method of claim 1, wherein the transmitting the further portion of the data to the destination network device comprises:

receiving the acknowledgement indicating interference prior to the time that the source network device is allocated to transmit to the destination network device again;
stopping the transmission to the destination network device in a channel;
identifying another coordination indicator in the channel; and
upon a monitor timer expires or detecting a fifth message for notifying the source network device to transmit in another resource coordination zone identified by the fifth message, transmitting the further portion of the data to the destination network device.

9. A network device to transmit data to another network device in a wireless network, the network device comprising:

a non-transitory machine-readable storage medium to store instructions; and a processor coupled with the non-transitory machine-readable storage medium to process the stored instructions, causing the network device to perform operations comprising:
  transmitting, to the another network device, a coordination indicator and a portion of data for the another network device, wherein the coordination indicator identifies a resource coordination zone to coordinate interference resolution;
  determining, prior to a time that the network device is allocated to transmit to the another network device again, whether an acknowledgement is received from the another network device; and
  transmitting the portion of data again or a further portion of the data to the another network device based on:
    receipt of the acknowledgement from the another network device, and
    detection of one or more messages in the resource coordination zone identified by the coordination indicator.

10. The network device of claim 9, wherein the transmitting the further portion of the data to the another network device comprises:
  receiving the acknowledgement indicating no interference prior to the time that the network device is allocated to transmit to the another network device again; and
  transmitting the further portion of the data to the another network device upon not detecting, in the resource coordination zone identified by the coordination indicator, either of:
    a first message for notifying that another network device plans to transmit, and
    a second message for requesting the network device to stop transmission.

11. The network device of claim 10, wherein the stored instructions cause the network device to further perform operations comprise:
  upon detecting the first message,
    stopping the transmission to the another network device, and
    transmitting a third message for notifying the network device to transmit in another resource coordination zone identified by the first message.

12. The network device of claim 10, wherein the stored instructions cause the network device to further perform operations comprise:
  upon detecting the first message,
  upon detecting the second message,
    stopping the transmission to the another network device in a channel;
    identifying another coordination indicator in the channel; and
    upon that a monitor timer expires or detecting a fourth message for notifying the network device to transmit in another resource coordination zone identified by the fourth message, transmitting the further portion of the data to the another network device.

13. The network device of claim 9, wherein the transmitting the further portion of the data to the another network device comprises:
  receiving the acknowledgement indicating interference prior to the time that the network device is allocated to transmit to the another network device again;
  stopping the transmission to the another network device in a channel;
  identifying another coordination indicator in the channel; and
  upon a monitor timer expires or detecting a fifth message for notifying the network device to transmit in another resource coordination zone identified by the fifth message, transmitting the further portion of the data to the another network device.

14. A method implemented at a destination network device in a wireless network, wherein a source network device transmits data to the destination network device, the method comprising:
  detecting that data from the source network device has been received at the destination network device;
  decoding successfully the data and a coordination indicator based on the data transmission detection, wherein the coordination indicator identifies a resource coordination zone to coordinate interference resolution;
  transmitting an acknowledgement indicating no interference to the source network device prior to a time that the source network device is allocated to transmit to the destination network device again; and
  communicating with the source network device based on one or more messages detected in the resource coordination zone.

15. The method of claim 14, wherein the coordination indicator further indicates resource elements for the interference resolution, and wherein a resource element uses a number of orthogonal frequency-division multiplexing (OFDM) subcarriers within an OFDM symbol.

16. The method of claim 14, wherein communicating with the source network device comprises:
  detecting, in the resource coordination zone, a first message for notifying that another source network device plans to transmit;
  transmitting, in the resource coordination zone, a second message for requesting the source network device to stop transmission, wherein the second message indicates another resource coordination zone; and
  transmitting, in the another resource coordination zone, a third message for notifying the source network device to transmit data.

17. The method of claim 14, further comprising:
  determining that data decoding fails;
  transmitting an acknowledgement indicating interference to the source network device prior to a time that the source network device is allocated to transmit to the destination network device again; and
  transmitting a fourth message for notifying another source network device to transmit within another resource coordination zone identified from another coordination indicator.

18. A network device to receive data from another network device in a wireless network, the network device comprising:
  a non-transitory machine-readable storage medium to store instructions; and
  a processor coupled with the non-transitory machine-readable storage medium to process the stored instructions, causing the network device to perform operations comprising:
    detecting that data from the another network device has been received at the network device;
    decoding successfully the data and a coordination indicator based on the data transmission detection, wherein the coordination indicator identifies a resource coordination zone to coordinate interference resolution;

transmitting an acknowledgement indicating no interference to the another network device prior to a time that the another network device is allocated to transmit to the network device again; and communicating with the another network device based on one or more messages detected in the resource coordination zone.

19. The network device of claim 18, wherein communicating with the another network device comprises:

detecting, in the resource coordination zone, a first message for notifying that another source network device plans to transmit;

transmitting, in the resource coordination zone, a second message for requesting the another network device to stop transmission, wherein the second message indicates another resource coordination zone; and transmitting, in the another resource coordination zone, a third message for notifying the another network device to transmit data.

20. The network device of claim 18, wherein the stored instructions cause the network device to further perform operations comprise:

determining that data decoding fails;

transmitting an acknowledgement indicating interference to the another network device prior to a time that the another network device is allocated to transmit to the network device again; and transmitting a fourth message for notifying the another network device to transmit within another resource coordination zone identified from another coordination indicator.

* * * * *